United States Patent
Okamoto et al.

(10) Patent No.: US 7,643,281 B2
(45) Date of Patent: Jan. 5, 2010

(54) STORAGE CONTROLLER

(75) Inventors: Homare Okamoto, Odawara (JP); Azuma Kano, Hiratsuka (JP); Akihito Yamanashi, Oyama (JP); Kouichi Tanaka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 180 days.

(21) Appl. No.: 11/898,774

(22) Filed: Sep. 14, 2007

(65) Prior Publication Data

US 2008/0148303 A1 Jun. 19, 2008

(30) Foreign Application Priority Data

Dec. 13, 2006 (JP) ............................. 2006-335312
Jul. 24, 2007 (JP) ............................. 2007-191820

(51) Int. Cl.
*H05K 7/20* (2006.01)
(52) U.S. Cl. ............................. 361/679.33; 361/679.48; 361/727; 360/69; 360/98.01; 714/5; 439/67
(58) Field of Classification Search ................. 720/652, 720/654; 714/5; 361/679.33, 679.48, 679.49, 361/727, 688, 741, 756, 788
See application file for complete search history.

(56) References Cited

U.S. PATENT DOCUMENTS

| | | | |
|---|---|---|---|
| 5,471,099 A | | 11/1995 | Larabell et al. |
| 5,751,549 A | * | 5/1998 | Eberhardt et al. ...... 361/679.33 |
| 6,407,910 B1 | | 6/2002 | Diaz et al. |
| 6,829,141 B2 | * | 12/2004 | Garnett et al. ......... 361/679.48 |
| 6,935,868 B1 | * | 8/2005 | Campini et al. ............... 439/67 |

(Continued)

FOREIGN PATENT DOCUMENTS

JP 2004-342269 5/2003

(Continued)

OTHER PUBLICATIONS

The Extended European Search Report dated Dec. 23, 2008 regarding European Patent Application No. 07253674.1-2210 / 1933325.

(Continued)

*Primary Examiner*—Jayprakash N Gandhi
*Assistant Examiner*—Courtney Smith
(74) *Attorney, Agent, or Firm*—Stites & Harbison PLLC; Juan Carlos A. Marquez, Esq.

(57) ABSTRACT

A storage controller of the present invention reduces maintenance work by the user by irreplaceably mounting the respective component parts inside an enclosure. A plurality of disk drives, which comprise a spare drive, and repair slots are arranged in close proximity in a matrix on the front side inside the enclosure. A backboard is disposed rearward of the respective disk drives. A plurality of control boards are arranged rearward of the backboard by being stacked one atop the other. A plurality of disk drives and a plurality of batteries respectively stacked one atop the other are arranged on the one side of the respective control boards. A plurality of power devices stacked one atop the other are arranged on the other side of the respective control boards. A plurality of cooling fans are arranged in the center part of the enclosure. The respective parts are affixed to the enclosure so as to be irreplaceable under normal circumstances.

7 Claims, 22 Drawing Sheets

U.S. PATENT DOCUMENTS

| | | |
|---|---|---|
| 7,046,470 B2 * | 5/2006 | Yamanashi et al. ............ 360/69 |
| 7,113,364 B2 * | 9/2006 | Nishiyama et al. ....... 360/98.01 |
| 7,394,660 B2 * | 7/2008 | Hidaka ....................... 361/727 |
| 2004/0160720 A1 | 8/2004 | Yamanashi et al. |
| 2004/0233563 A1 | 11/2004 | Wada et al. |
| 2004/0264131 A1 | 12/2004 | Nishiyama et al. |
| 2005/0257232 A1 | 11/2005 | Hidaka |
| 2007/0124529 A1 * | 5/2007 | Carr et al. ................... 710/317 |

FOREIGN PATENT DOCUMENTS

| | | |
|---|---|---|
| JP | 2005-327390 | 5/2004 |
| WO | WO 2006/086087 A2 | 12/2005 |

OTHER PUBLICATIONS

Office Action from Chinese Patent Office dated Jul. 10, 2009.

* cited by examiner

STORAGE CONTROLLER

CROSS-REFERENCE TO PRIOR APPLICATION

This application relates to and claims the benefit of priority from Japanese Patent Application number 2006-335312, filed on Dec. 13, 2006, and Japanese Patent Application No. 2007-191820 filed on Jul. 24, 2007, the entire disclosure of which is incorporated herein by reference.

BACKGROUND OF THE INVENTION

1. Field of the Invention

The present invention relates to a storage controller.

2. Description of the Related Art

A storage controller can provide large capacity storage services to a host computer (hereinafter, "host"). In a storage controller, for example, a storage area based on RAID (Redundant Array of Independent Disks) is constructed using a large number of disk drives. A logical volume (LU: Logical Unit), which is a logical storage area, is configured on the physical storage area of each disk drive. A host can read and write data from and to this logical volume.

However, a rack-mounted disk array apparatus is also known as a storage controller (Japanese Patent Laid-open No. 2005-327390). In this rack-mounted disk array apparatus, a plurality of hard disk units and interface units are replaceably disposed inside a rack installed in an enclosure. When replacing a hard disk unit, the user pulls out the hard disk unit to be replaced from the front side of the enclosure, and installs a new hard disk unit.

Further, technology for replaceably providing one hard disk drive at a time at the top and bottom of a main board is also known (Japanese Patent Laid-open No. 2004-342269).

In the above respective conventional technologies, there are disclosed storage controllers, which mount a plurality of hard disk drives inside relatively small enclosures, and which are capable of providing a RAID-based storage area. However, both of the above-mentioned conventional technologies are structured to enable the replacement of a hard disk drive. Therefore, the user can remove a hard disk drive in which a failure has occurred from the enclosure, and mount a new hard disk drive in the enclosure.

However, in recent years, due to the increasing amounts of data that must by managed by even small-scale organizations like the so-called SOHO (Small Office Home Office), demand for storage controllers has increased. In the case of large-scale users like big companies, an information technology management specialist manages the storage controller. Because a specialist has a certain degree of knowledge and skill in the construction and use of storage controllers, he can easily replace a malfunctioning hard disk drive. That is, large users can perform maintenance work on their storage controllers themselves. By contrast, small users do not have the financial wherewithal to hire specialists to manage their storage controllers, making it difficult for them to perform maintenance work on their storage controllers themselves.

However, the respective conventional technologies mentioned above are constituted to enable hard disk drives to be replaced, and rely on the user to perform storage controller maintenance, thereby lowering usability for small users, and leaving room for improvement.

Further, the above-mentioned respective conventional technologies replaceably provide a relatively small number of hard disk drives, such as two drives, inside an enclosure, without taking into account the installation of greater numbers of hard disk drives. That is, in the case of a constitution that comprises only a small number of hard disk drives, the operating noise from the respective hard disk drives is low, reducing the need for soundproofing measures. However, when a larger number of hard disk drives are mounted in an enclosure, it becomes necessary to increase the cooling capabilities of the cooling fans, and also necessitates that soundproofing measures be taken in line with this.

SUMMARY OF THE INVENTION

With the foregoing in view, an object of the present invention is to provide a storage controller capable of enhancing the ease-of-use of the user. Another object of the present invention is to provide a storage controller that reduces maintenance work for the user, and enhances usability by replacing the entire system when a failure occurs. Yet another object of the present invention is to provide a storage controller that makes it possible to integratively mount a large number of storage devices inside a relatively small enclosure, and to enhance usability and reliability. Other objects of the present invention should become clear from the descriptions of the embodiments, which will be explained hereinbelow.

To solve for the above problems, a storage controller according to one aspect of the present invention comprises an enclosure, a plurality of storage devices, which are disposed inside this enclosure, and which are for storing data, at least one control board, which is disposed inside the enclosure, and which is for controlling the operation of the respective storage devices, at least one power device, which is disposed inside the enclosure, and which is for supplying power to the respective storage devices and control board, at least one cooling fan, which is disposed inside the enclosure, and which is for taking in air from outside the enclosure and generating a cooling airflow inside the enclosure, and at least one device connector for connecting a new storage device other than the respective storage devices inside the enclosure to the control board, and at least the respective storage devices, a control board, power device and cooling fan are provided inside the enclosure so as to be irreplaceable under normal circumstances. Even when the respective storage devices, which were irreplaceably mounted in the enclosure beforehand, become unusable, a new storage device can be replaceably attached to the device connector in order to make data storage possible.

In one aspect of the present invention, at least one storage device of the respective storage devices provided beforehand inside the enclosure can be preconfigured as a reserved storage device.

In one aspect of the present invention, the control board is constituted from a set of two circuit boards having the same configuration, and control structures for controlling the operation of the respective storage devices can be disposed on the respective circuit boards.

In one aspect of the present invention, the control board is constituted from a plurality of circuit boards having a different shape, and the control structure for controlling the operation of the respective storage devices is duplexed in accordance with respective electronic circuits formed on each circuit board.

In one aspect of the present invention, the cooling fan is located in substantially the center part between an inlet provided in one face of the enclosure, and an outlet provided in the other face of the enclosure, and is arranged inside the enclosure so as to be irreplaceable under normal circumstances.

In one aspect of the present invention, the respective storage devices are arranged in a matrix in one side of the enclosure by placing a plurality of storage devices in close proximity to one another to form a row, and stacking a plurality of rows one atop the other in close proximity, and the control board is located in the other side of the enclosure, and is provided inside the enclosure so as to be irreplaceable under normal circumstances, and the respective storage devices and control board are connected via a connection board, and inlets are formed between the respective storage devices to take air into the inside of the enclosure, and an outlet is formed in the other side of the enclosure to discharge to the outside of the enclosure a cooling airflow generated by the cooling fan.

In one aspect of the present invention, a connection board is provided perpendicularly on the inside of the enclosure, the respective storage devices are each connected to one side of the connection board, and the control board is connected to the other side of the connection board.

In one aspect of the present invention, a connection board is located in the one side of the enclosure, and disposed horizontally inside the enclosure, the respective storage devices are arranged in the same numbers on the bottom side and on the top side of the connection board, and respectively connected to the connection board, and the control board is disposed horizontally on the inside of the enclosure so as to be connected to the other end of the connection board.

In one aspect of the present invention, the power device comprises power capacity corresponding to the number of storage devices having a possibility of being used simultaneously of the respective storage devices.

DESCRIPTION OF THE SPECIFIC EMBODIMENTS

Figure 1:
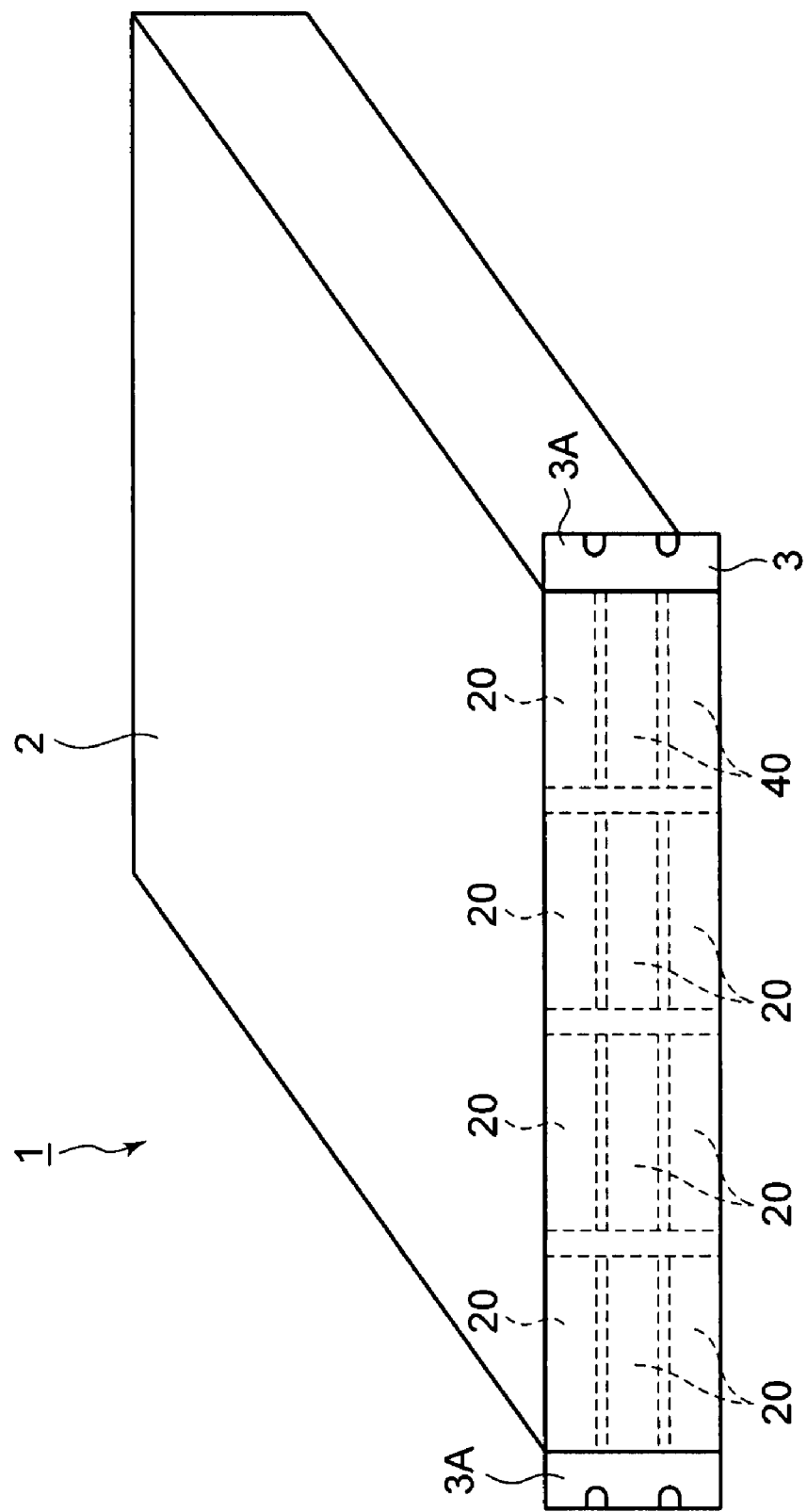
FIG. 1 is an external view of a storage controller according to an embodiment of the present invention.

The embodiments of the present invention will be explained below on the basis of the figures. These embodiments, as will be explained hereinbelow, comprise an enclosure 2, a plurality of storage devices 20, which are disposed inside this enclosure 2, and which are for storing data, at least one control board 10, which is disposed inside the enclosure 2, and which is for controlling the operation of the respective storage devices 20, at least one power device 50, which is disposed inside the enclosure 2, and which is for supplying power to the respective storage devices 20 and the control board 10, at least one or more cooling fans 71, 72, 73, which are disposed inside the enclosure 2, and which are for taking in air from outside the enclosure 2 and generating a cooling airflow inside the enclosure 2, and at least one device connector 40 for connecting a new storage device other than the respective storage devices 20 inside the enclosure 2 to the control board 10, and at least the respective storage devices 20, control board 10, power device 50 and cooling fans 71, 72, 73 are provided inside the enclosure 2 so as to be irreplaceable under normal circumstances.

First Embodiment

FIG. 1 is an oblique view showing the outside of a storage controller 1. This storage controller 1, for example, can be detachably connected to a rack.

The storage controller 1, for example, comprises an enclosure 2, a front bezel 3, which is provided so as to cover the front side of the enclosure 2, and a plurality of disk drives 20 arranged in a matrix in the front side of the enclosure 2. Furthermore, as will be explained hereinbelow, a control board 10, a backboard 30, a repair drive slot 40 for adding a new disk drive when a disk drive 20 installed beforehand fails, a power device 50, a battery 60, and cooling fans 71, 72, 73 are respectively provided inside the enclosure 2.

A large number of openings are disposed in the front bezel 3. This is to allow air outside of the enclosure 2 to flow into the inside of the enclosure 2. Mounting parts 3A are disposed at both ends of the front bezel 3. The storage controller 1 can be detachably mounted to another enclosure, such as a rack, using these mounting parts 3A. Further, details will be described using FIG. 3, but inlets are formed between the respective disk drives 20 for guiding air from outside of the enclosure 2 to the inside of the enclosure 2.

Figure 2:
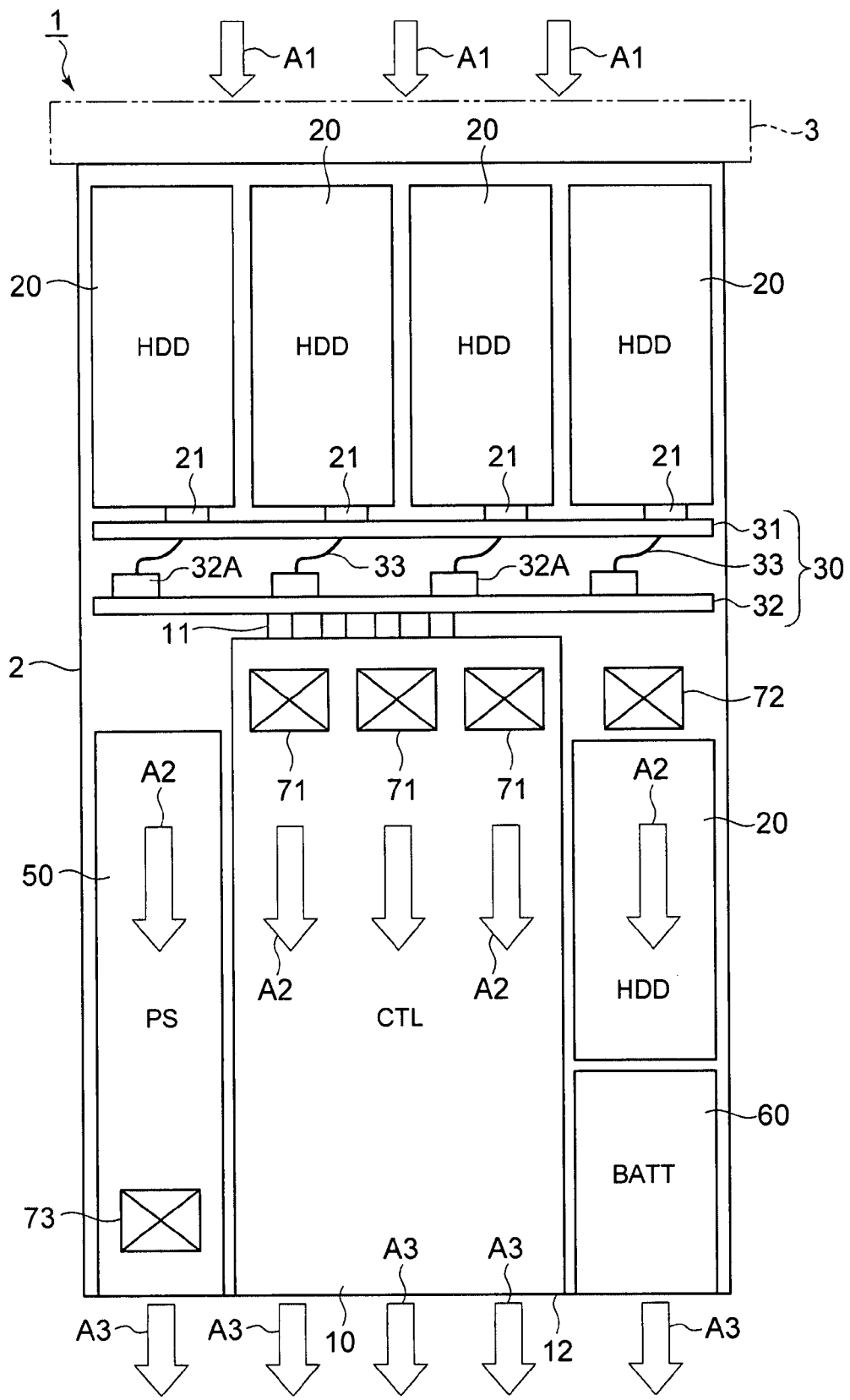
FIG. 2 is a plan view of the storage controller shown with the enclosure removed.

FIG. 2 is a plan view of the storage controller 1 with the enclosure 2 and front bezel 3 removed. In the front side of the enclosure 2, disk drives 20 are arranged in a matrix as "storage devices".

More specifically, disk drives 20 are integratively arranged in a matrix by using four disk drives to form a row, and stacking three rows one atop the other. For example, a hard disk drive like a FC (Fibre Channel) disk, SATA (Serial AT Attachment) disk and SAS (Serial Attached SCSI) disk are used as disk drives 20. The present invention is not limited to hard disk drives, and, for example, various rewritable and nonvolatile storage devices, such as a flash memory or other such semiconductor memory device, a magneto-optical disk drive, an optical disk drive, a magnetic tape drive, a flexible disk drive, and a holographic memory device can also be utilized.

It should be noted here that the respective disk drives 20 are mounted in the enclosure 2 so as to be irreplaceable under normal circumstances. Mounted in the enclosure 2 so as to be irreplaceable under normal circumstances means that the respective disk drives 20 cannot be replaced by a user. Even if the front bezel 3 is removed, a user cannot pull a disk drive 20 out of the enclosure 2, and insert a new disk drive 20 into the open space. That is, in this embodiment, the respective components 10, 20, 30, 40, 50, 60, 71, 72, 73 inside the enclosure 2 are respectively fastened to the inside of the enclosure 2, and cannot be replaced manually. The fact that there is absolutely no intention to have replacement work performed by a user makes the storage controller 1 of this embodiment substantially different from a storage controller of the prior art. The other components, that is, the control board 10, backboard 30, power device 50, battery 60, and cooling fan 71 are also mounted so as to be irreplaceable under normal circumstances the same as the disk drives 20.

Figure 4:
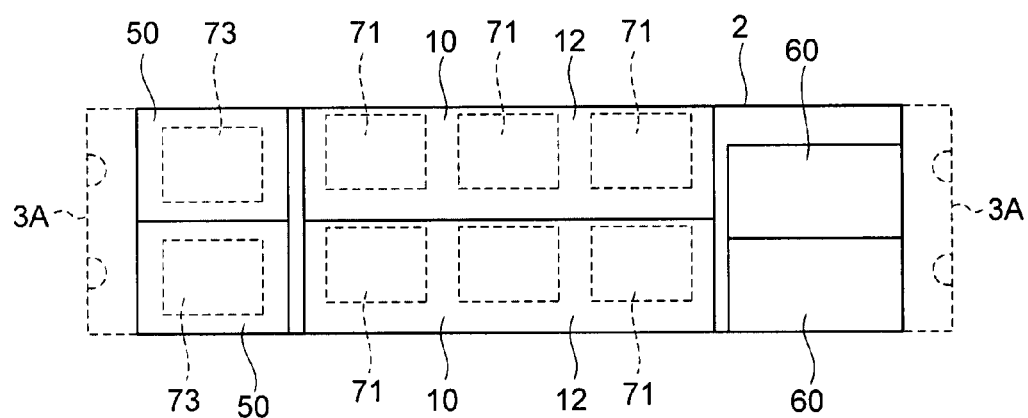
FIG. 4 is a rear view of the storage controller.

Control boards 10 are arranged in the posterior of the enclosure 2 stacked one atop the other. The respective control boards 10 are located rearward of the respective disk drives 20, and are disposed horizontally inside the enclosure 2. As shown in FIG. 4, two control boards 10 are arranged one atop the other in the center of the posterior part of the enclosure 2. The respective control boards 10 control the operations of the respective disk drives 20 in accordance with access requests from a host H as a higher-level device (refer to FIG. 5).

Between the rear side of the respective disk drives 20 and the front side of the respective control boards 10, a backboard 30 is disposed orthogonal to the respective control boards 10 as a "connection board". The backboard 30, for example, can be constituted from a first board 31, which connects to the disk drives 20, a second board 32, which is connected to the connectors 11 of the respective control boards 10, and a cable 33, which connects the first board 31 and the second board 32.

The front side of the first board 31 is electrically connected to the connectors 21 disposed on the rear sides of the respective disk drives 20. The rear side of the second board 32 is electrically connected to the respective connectors 11 disposed on the front sides of the respective control boards 10. Then, the first board 31 and the second board 32 are electrically connected by connectors 32A, which are disposed on the front side of the second board 32, and cables 33. Furthermore, the above constitution is merely an example, and the backboard 30 can also be constituted from a single board as described hereinbelow.

The respective repair drive slots 40, for example, are located on the right side of the front face of the enclosure 2, and are arranged one atop the other. A repair drive slot 40 is a slot for a user to mount a disk drive 20 for repair use. A repair disk drive (hereinafter, may be called a repair disk) 20 is a disk drive used for data recovery after using a spare disk drive 20, which is built into the enclosure 2 at the outset.

A detailed explanation will be provided below, but when a failure occurs in a normal disk drive 20 for storing data utilized by the host H, data recovery work is carried out using a spare disk drive (hereinafter, may be called spare disk) 20, which is built into the enclosure 2, and which has been allocated as a spare beforehand. Spare disk, for example, signifies two of the 12 disk drives 20 mounted in the enclosure beforehand, and the mounting location can be arbitrarily configured. After using up all the spare disks, the user mounts a new disk drive 20 in a repair drive slot 40 when another drive failure occurs. Data recovery can be carried out using this new disk drive 20 (repair disk). Furthermore, in addition to data recovery work, a repair disk can also be used to backup data.

The respective power devices 50, for example, are located on the other side of the respective control boards 10, and are arranged one atop the other. The power device 50 supplies power of a prescribed voltage to the respective disk drives 20, respective control boards 10 and so forth.

The respective batteries 60 are located on the one side of the respective control boards 10, and are arranged one atop the other rearward of the respective repair drive slots 40. A battery 60 supplies power at a prescribed voltage for a short period of time to the respective disk drives 20 and respective control boards 10 when the power output from the power device 50 is interrupted. During the period that power is being backed up by battery 60, data stored in cache memory 142 (refer to FIG. 6) can be written to a disk drive 20.

A plurality of cooling fans 71, 72, 73 can be disposed inside the enclosure 2. For example, three cooling fans 71 are disposed in the front side of the respective control boards 10. One cooling fan 72 is disposed in the space on front side of the repair drive slots 40. One cooling fan 73 is built into the rearward side of each of the power devices 50.

The number and arrangement of the cooling fans 71, 72, 73 are not limited to the example described above. The constitution can also be such that only one or two cooling fans comprising sufficient cooling capabilities are disposed inside the enclosure 2. However, generally speaking, the cooling capabilities of a cooling fan depend on the external dimensions and number of revolutions of the fan. The bigger the fan and the faster it is made to rotate, the higher the cooling capability, but noise also increases. It is possible to reduce noise while ensuring cooling capabilities to a certain extent by rotating a bigger fan at low speed. When the external dimensions of a fan are increased, the space required to mount the cooling fan also becomes larger, thereby increasing the thickness dimension of the enclosure 2. With the foregoing in view, this embodiment is constituted to achieve the cooling capabilities required for the storage controller 1 by using a plurality of cooling fans 71, 72, 73.

It should be noted here that the majority of the cooling fans 71, 72, 73 are arranged substantially in the center part of the enclosure 2. That is, the cooling fans 71 for cooling the respective control boards 10, and the cooling fan 72 for cooling the respective repair drive slots 40 and respective batteries 60 are disposed on the rear side of the backboard 30. Therefore, it is possible to hold down the leakage of noise generated from these cooling fans 71, 72 outside the enclosure 2. As will be clear from the embodiments explained hereinbelow, the cooling fan 73 for cooling a power device 50 can also be disposed so as to be located in the center part of the enclosure 2.

The flow of the cooling air will be explained. When the respective cooling fans 71, 72, 73 operate, air A1 on the outside of the enclosure 2 is drawn into the inside of the enclosure 2 by way of gaps between the respective disk drives 20. By flowing through the gaps between the respective disk drives 20, the air A1 captures the heat from each disk drive 20, thereby cooling each disk drive 20.

The air A1 that flows inside the enclosure 2 via the gaps between the respective disk drives 20 becomes cooling air A2, and flows toward the rear of the enclosure 2 while cooling the respective parts inside the enclosure 2. The cooling air A2, which cools the respective parts, is discharged to the outside of the enclosure 2 via a gap disposed towards the rear of the enclosure 2. This discharged cooling air is shown as A3 in the figure. Furthermore, the flow of the cooling air is shown schematically in FIG. 2, but the actual flow may differ.

Figure 3:
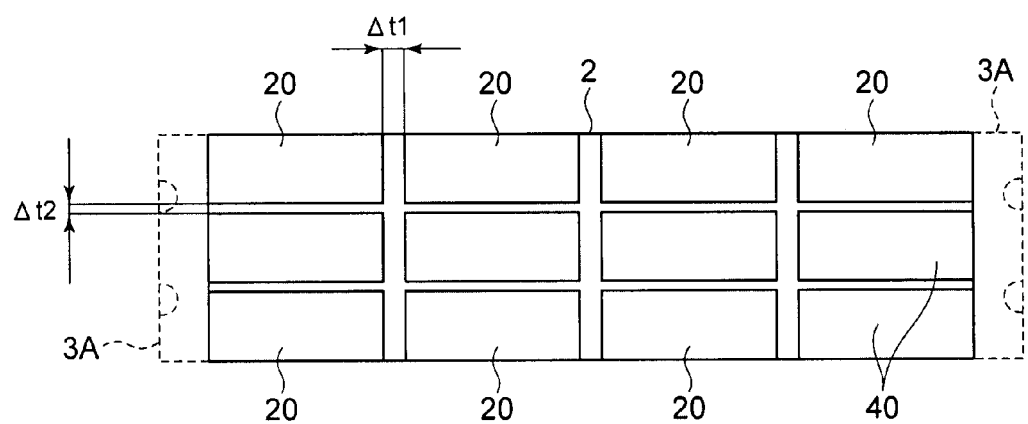
FIG. 3 is a front view of the storage controller.

FIG. 3 is a schematic diagram showing the disk drives 20 from the front with the front bezel 3 removed. As shown in FIG. 3, a total of 12 disk drives 20 can be arranged in a matrix of four across and three top-to-bottom by lining up four disk drives 20 side-by-side to form a row, and stacking three such rows vertically one atop the other.

Gaps Δt1 are disposed between the respective disk drives 20 of each row, and other gaps Δt2 are disposed between the respective rows of disk drives 20. These respective gaps Δt1, Δt2 constitute "inlets". In this embodiment, the area of the inlets is made as large as possible without increasing the thickness dimension (height dimension) of the enclosure 2 by making the gaps Δt1 in the row direction larger than the gaps Δt2 in the tier direction.

FIG. 4 is a schematic diagram showing the rear view of the enclosure 2. As shown in FIG. 4, the respective control boards 10 each comprise three cooling fans 71, and are stacked one atop the other. That is, two control boards 10 are stacked in the thickness direction of the enclosure 2. Similarly, the respective power devices 50, batteries 60 and disk drives 20 are all stacked vertically one atop the other.

Then, outlets 12 are disposed in the rear side of the enclosure 2, and cooling air inside the enclosure 2 is discharged to the outside of the enclosure 2 via these outlets 12. The outlets 12 are constituted as gaps between the respective elements (fans and electronic components) inside the enclosure 2. Furthermore, although omitted from the figure, the back face of the enclosure 2 can be covered by a plate having a large number of openings.

Figure 5:
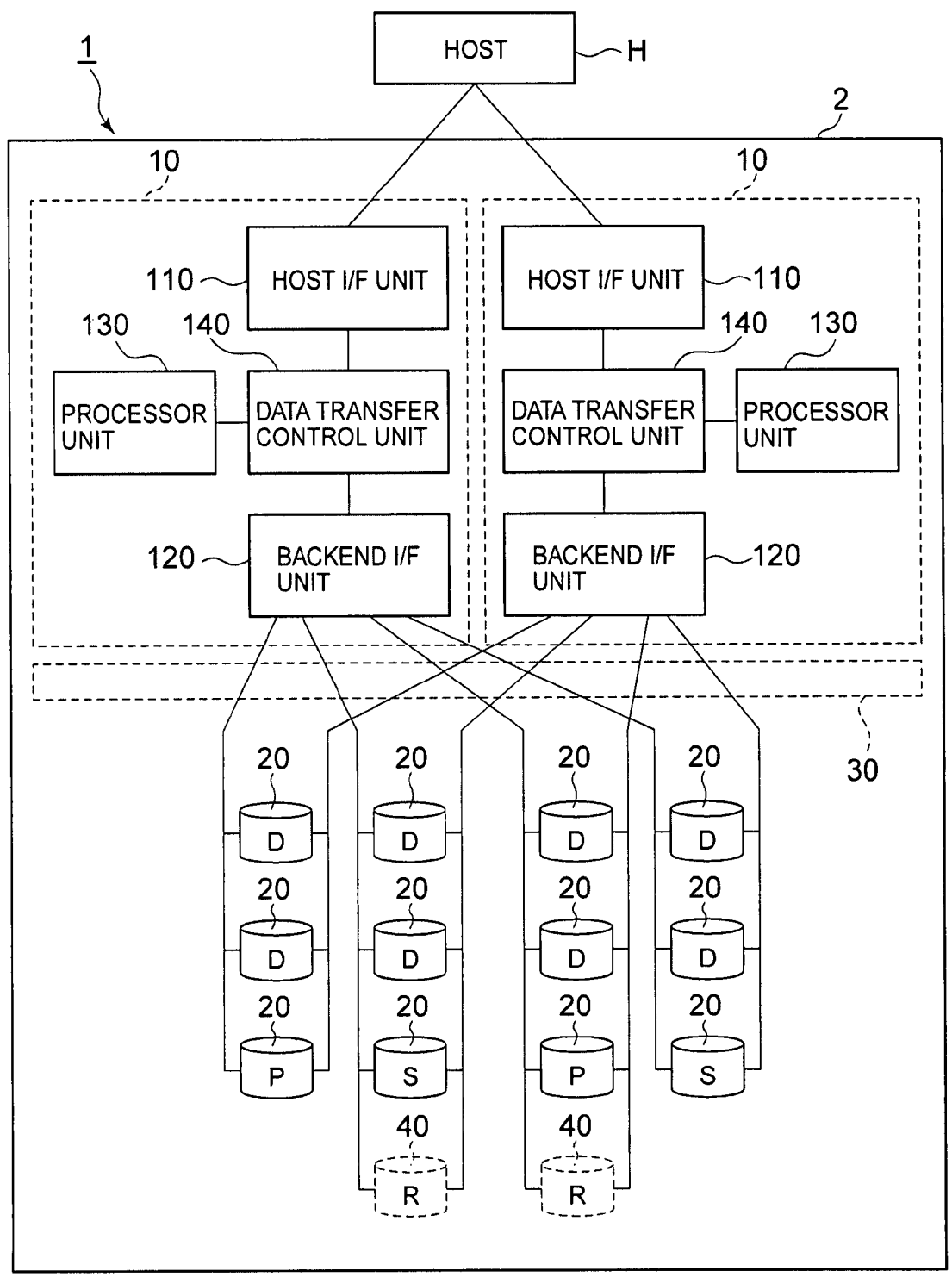
FIG. 5 is a block diagram of the storage controller.

FIG. 5 shows a block diagram of the storage controller 1. The storage controller 1 can be broadly divided into a controller portion and a storage portion. The controller portion is constituted by the respective control boards 10. The storage portion is constituted by the respective disk drives 20. The controller portion and the storage portion are connected by an interface portion (the backboard 30).

The respective control boards 10, for example, are constituted comprising a host interface unit 110, backend interface unit 120, processor unit 130, and data transfer control unit 140. Details concerning the respective units 110, 120, 130, 140 will be explained hereinbelow using FIG. 6. Briefly stated, the host interface unit 110 is for exchanging data with the host H. The backend interface unit 120 is for exchanging data with the respective disk drives 20. The processor unit 130 is for controlling the overall operation of the storage controller 1. The data transfer control unit 140 is for controlling the transfer of data received from the host H, and data read out from the respective disk drives 20.

The two control boards 10 are designed to backup one another. That is, data received from the host H is respectively stored in both control boards 10. Then, even if a failure should occur in either one of the control boards 10, processing can be continued by the other control board 10.

The respective backend interface units 120 are connected to the respective disk drives 20. Therefore, even if a failure should occur in either one of the backend interface units 120 or in the communication path (the communication path between the backend interface unit 120 and the respective disk drives 20), the respective disk drives 20 can be accessed via the other backend interface unit 120 and other communication path.

Disk drives 20 can be broadly divided into one of three types according to their use. A first type is a disk drive used to store data. A disk drive 20 belonging to this first type can be divided into a disk drive 20 for storing data (D) and a disk drive 20 for storing parity data (P). A disk drive 20 for storing data may be called a data disk, and a disk drive 20 for storing parity data may be called a parity disk. Furthermore, data and parity can also be distributed and stored in a plurality of disk drives 20. That is, each disk drive 20 can respectively store data and parity. In FIG. 5, the respective disk drives 20 are divided into data disks (D) and parity disks (P) for convenience of explanation. The storage controller 1 of this embodiment comprises eight data disks and two parity disks. Therefore, two physical storage devices of a 4D+1P RAID configuration can be created.

The second type is a spare disk drive 40 (S). A spare disk drive (spare disk) is a reserved disk drive, which is used when a failure occurs in either of the first types of disk drive 20 (data disk or parity disk). The storage controller 1 of this embodiment comprises two spare disks.

The third type is the repair disk drive 20 (R). A repair disk drive (repair disk) is a disk drive, which is used after all the spare disks have been utilized. Therefore, a repair disk can also be thought of as a second spare disk.

The first point that should be noted here is that, whereas the data disks, parity disks and spare disks are mounted inside the enclosure 2 beforehand, a repair disk is not mounted in the enclosure 2 initially. The storage controller 1 only comprises a plurality of repair drive slots 40. A user mounts a disk drive 20 in a repair drive slot 40 as necessary, thereby enabling this mounted disk drive 20 to be used as a repair disk.

The second point that needs to be noted is that, whereas the data disks, parity disks and spare disks are mounted inside the enclosure 2 such that a user is not able to replace them, a repair disk is detachably disposed in a repair drive slot 40. Then, new disk drives 20 can be replaceably mounted one after the other in the repair drive slot 40.

Figure 6:
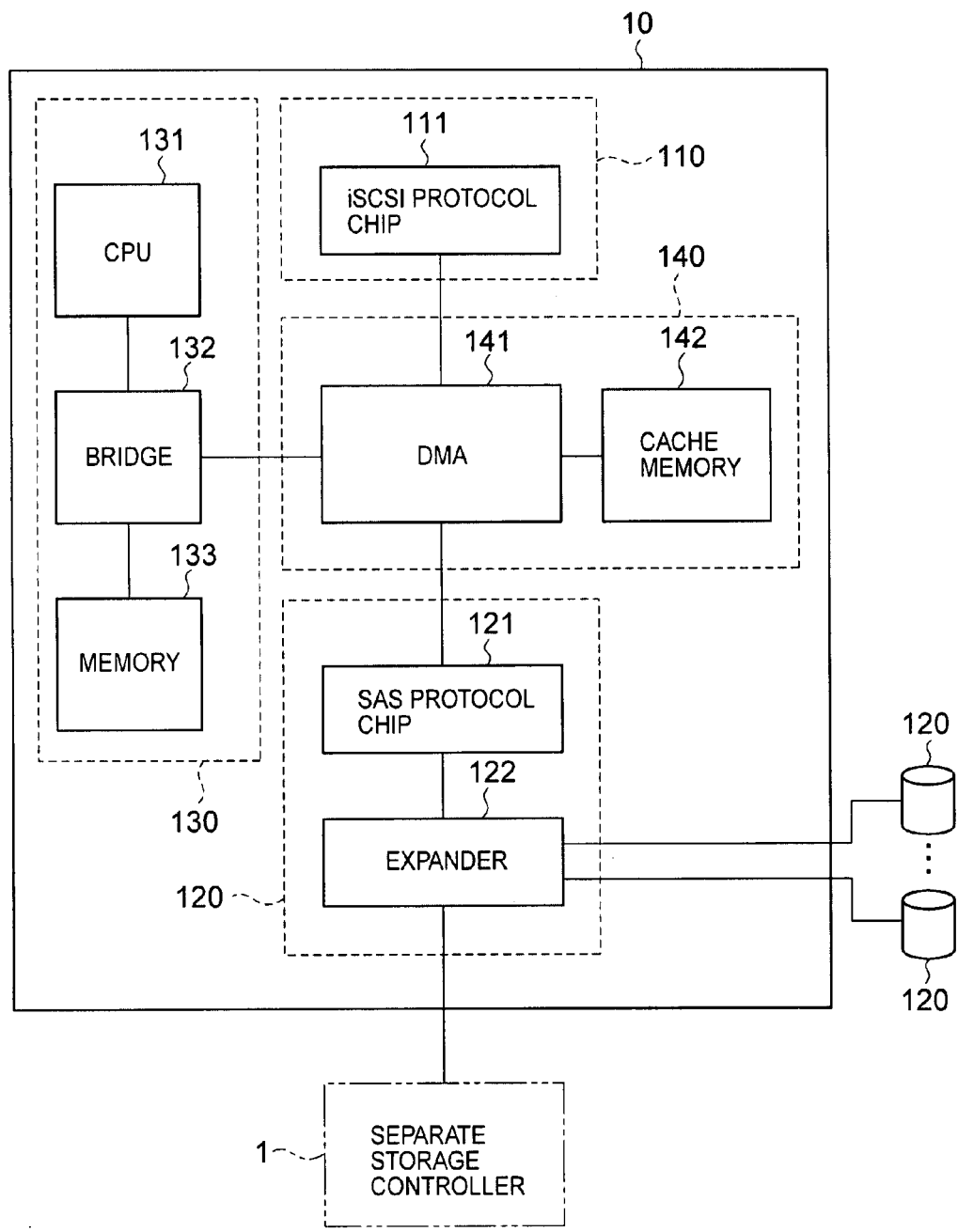
FIG. 6 is a block diagram of the control board.

FIG. 6 is a block diagram showing the constitution of the control board 10. The host interface unit 110, for example, is constituted comprising an iSCSI (internet Small Computer System Interface) protocol chip 111. This protocol chip 111 is a circuit for carrying out communications with the host H on the basis of the iSCSI protocol.

The backend interface unit 120, for example, is constituted comprising an SAS protocol chip 121 and an expander 122. The SAS protocol chip 121 is a circuit for carrying out communications with the respective disk drives 20 on the basis of the SAS protocol. When a disk drive 20 is a disk other than a SAS (Serial Attached SCSI) disk, a chip capable of processing the protocol corresponding to this disk is provided instead. The expander 122 is an expansion port for connecting a control board 10 to an external device (a disk drive 20 or another storage controller 1).

The processor unit 130, for example, is constituted comprising a microprocessor 131, a bridge 132, and a memory 133. The bridge 132 connects the microprocessor 131 and the memory 133. Further, the microprocessor 131 is also connected to a DMA circuit 141 by the bridge 132. The microprocessor 131 processes an access request from the host H by reading in and executing various programs stored beforehand in the memory 133.

The data transfer control unit 140, for example, is constituted comprising a DMA (Direct Memory Access) circuit 141, and a cache memory 142. The DMA circuit 141 is a circuit for enabling the respective protocol chips 111, 121 to access cache memory 142 without going through the microprocessor 131. The cache memory 142 is a memory for temporarily storing data received from the host H, and data that has been read out from a disk drive 20.

The respective protocol chips 111, 121 and the DMA circuit 141, and the bridge 132 and DMA circuit 141 are respectively connected via a serial transfer interface known as a PCI Express.

It should be noted here that the storage controller 1 of this embodiment can be connected to another storage controller 1. Consequently, it is possible to move data stored inside the storage controller 1 by transferring same to the inside of another, new storage controller 1. A communication port for carrying out a data transfer between storage controllers like this can be disposed in the posterior part of the control board 10.

Figure 7:
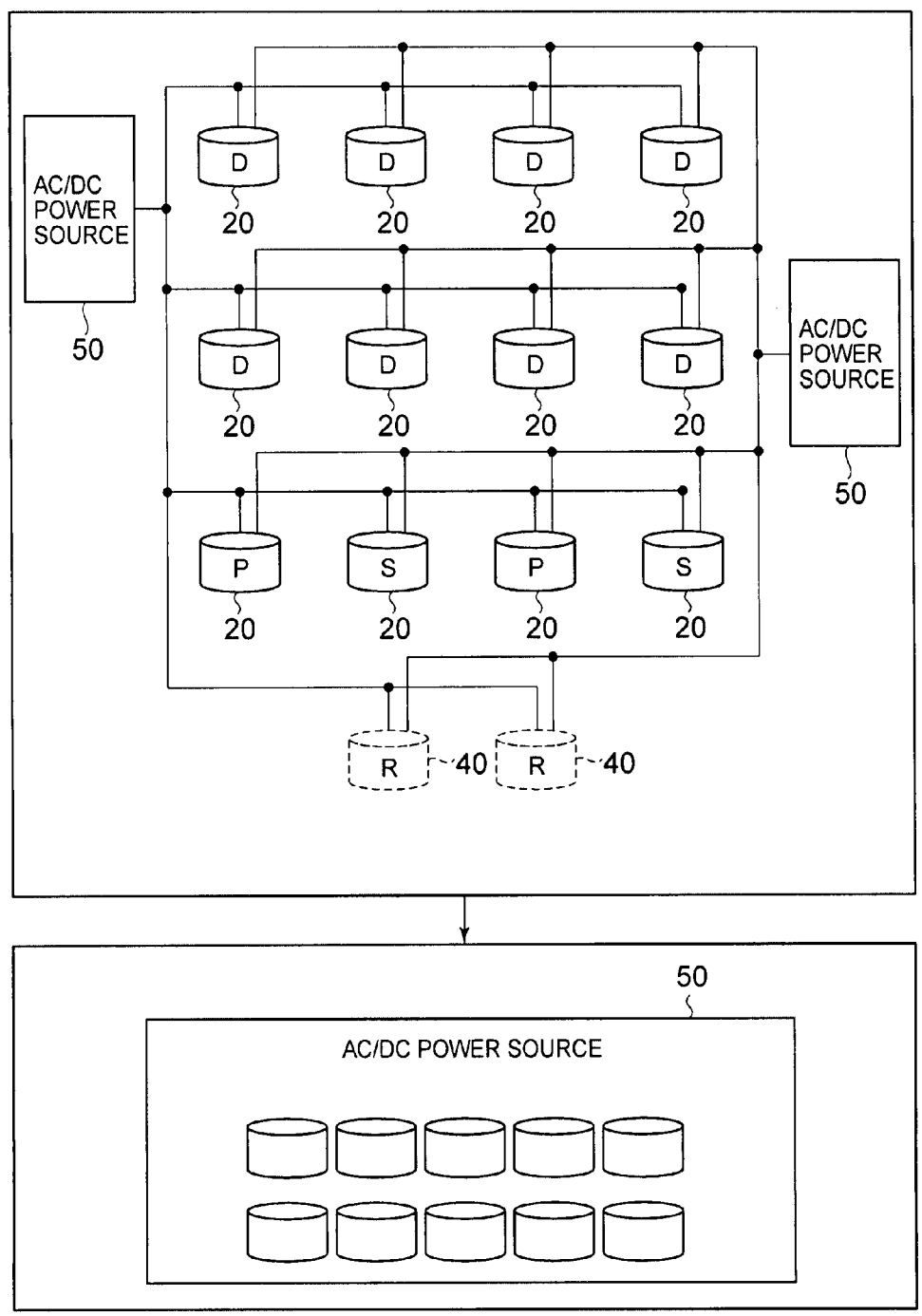
FIG. 7 is a schematic diagram showing the power supply structure to a disk drive, and the power capacity of the power device.

FIG. 7 is a schematic diagram showing the power supply structure of the storage controller 1. The respective power devices 50, for example, convert alternating current power inputted from outside to direct current power of a prescribed voltage, and supply same to the respective disk drives 20, respective control boards 10, and respective cooling fans 71, 72, 73. For convenience sake, only the power devices 50 and disk drives 20 are shown in FIG. 7.

As shown in FIG. 7, the respective power devices 50 are connected to the respective disk drives 20. Therefore, if a failure should occur in either one of the power devices 50, direct current power can be supplied using the other power device 50. Although omitted from the figure, when the storage controller 1 requires a plurality of types of direct current voltage, the respective power devices 50 are constituted so as to output a plurality of types of direct current voltage.

The power capacity of the respective power devices 50 is schematically shown at the bottom of FIG. 7. In this embodiment, the power capacity of the respective power devices 50 is set so as to enable direct current power to be supplied to the largest number of disk drives 20 having a possibility of being simultaneously operated, of the respective disk drives 20. More specifically, the respective power devices 50 comprise the power capacity to ensure that ten disk drives 20 operate simultaneously. In actuality, the maximum number of disk drives capable of being mounted in the storage controller 1 is 14 including repair disks. However, the power capacity of the power devices 50 is configured at 10 units. This is because a spare disk and a repair disk are only used when a failure occurs in either a data disk or a parity disk, and since it is possible to shut off the power to a disk drive 20 in which a failure has occurred, 10 units' worth of power capacity is sufficient. Thus, in this embodiment, configuring the power capacity of the power devices 50 for the lowest value required means that the power devices 50 can be made smaller, and manufacturing costs can be reduced.

Figure 8:
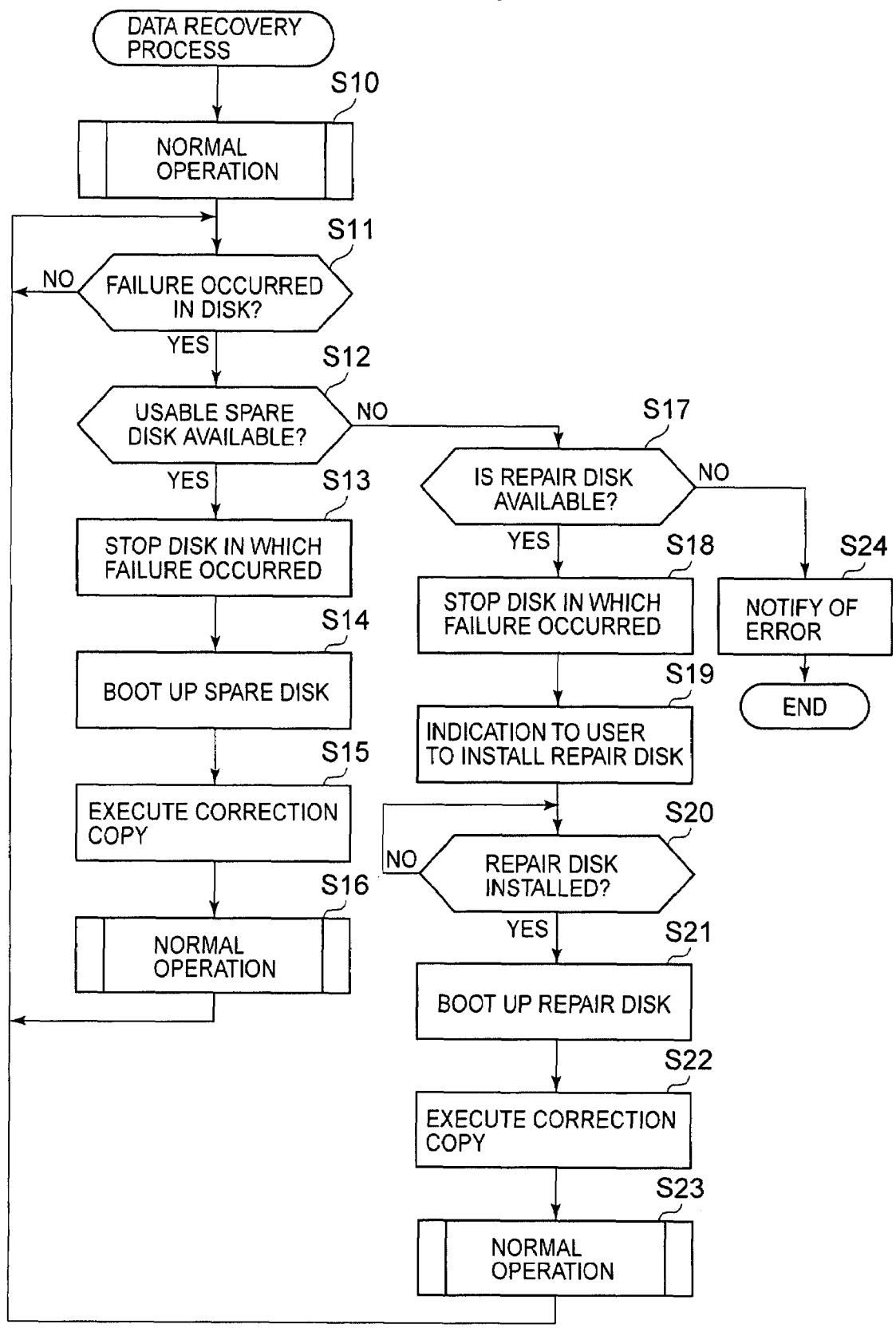
FIG. 8 is a flowchart showing a data recovery process.

FIG. 8 is a flowchart showing a data recovery process when a failure occurs in a disk drive 20 (in either a data disk or a parity disk). The processing of this flowchart is executed by the control board 10. For convenience sake, the flowchart will be explained using the storage controller 1 as the operating entity. Furthermore, the respective flowcharts shown hereinbelow will show overviews of operations, and may differ from actual programs. A so-called person with an ordinary skill in the art should be able to replace a step, omit a portion of the steps, and/or add a new step in a flowchart.

When the respective disk drives 20 are operating normally, the storage controller 1 executes normal operation (S10). Under normal operation, for example, a write process or a read process is carried out. For example, when a write command is issued from the host H, the storage controller 1 writes the write-data received from the host H into the cache memory 142, and notifies the host H to the effect that write command processing has ended. Or, the storage controller 1 notifies the host H that write command processing has ended subsequent to computing the parity of the write-data, and respectively writing the data and parity to a prescribed disk drive 20.

When the host H issues a read command, if the requested data exists in the cache memory 142, the storage controller 1 reads this data from the cache memory 142, and sends this data to the host H. When the data requested from the host H does not exist in the cache memory 142, the storage controller 1 reads the data from the prescribed disk drive 20 and sends the data to the host H.

The storage controller 1 constantly monitors whether or not a failure has occurred in a disk drive (either a data disk or a parity disk) 20 (S11). When the occurrence of a failure is detected (S11: YES), the storage controller 1 determines whether or not there is a spare disk that can be used (S12). A normal spare disk that is not in use can be used.

When there is a spare disk that is not being used (S12: YES), the storage controller 1 stops the power supply to the failed disk drive 20 (S13), supplies power to the spare disk, and boots the spare disk up (S14). Since power is being supplied to a spare disk instead of the failed disk drive 20, the power capacity of the power device 50 is sufficient.

The storage controller 1, after confirming that the spare disk is operating normally, executes a correction copy (S15). A correction copy is a process for restoring the data that should be stored in the failed disk drive 20 by performing a logical operation on the data and parity stored in the other disk drives 20 that belong to the same parity group as the failed disk drive 20, and writing this restored data to the spare disk.

After the correction copy has ended, the spare disk in which the recovered data is stored is used as either a normal data disk or parity disk. Consequently, the storage controller 1 carries out normal operation (S16).

As described hereinabove, the storage controller 1 comprises two spare disks. Therefore, the storage controller 1 is able to support two units' worth of drive failures. When the two spare disks are both being used (S12: NO), the storage controller 1 determines whether or not a repair disk is available (S17). For example, when a repair drive slot 40 is free, the storage controller 1 determines that a repair disk is available. By contrast, when repair disks are installed and already being used inside the respective repair drive slots 40, the storage controller 1 determines that a repair disk is not available.

When a repair disk cannot be used (S17: NO), data recovery is not possible, and the storage controller 1 notifies the user of an error (S24). For example, the user can be notified of an error by displaying a warning message on the screen of the host H, or by causing a warning light disposed in the storage controller 1 to blink. Or, the user can be notified of an error by a voice message. Furthermore, for example, when the storage controller 1 comprises a small screen, like a liquid crystal display, an error message can also be displayed on this screen.

When a repair disk is available (S17: YES), the storage controller 1 stops the power supply to the failed disk drive 20 (S18). The storage controller 1 indicates to the user to install a repair disk in the repair drive slot 40 (S19). This indication can be carried out using the same methods as those used to notify the user of an error.

The storage controller 1 monitors whether or not a repair disk is installed in the repair drive slot 40 (S20). When a repair disk is mounted in the repair drive slot 40 (S20: YES), the storage controller 1 supplies direct current power to the repair disk, boots the repair disk up (S21), and executes a correction copy (S22). Data restored by a logical operation is written to the repair disk inside the repair drive slot 40. Then, the storage controller 1 carries out normal operation using the repair disk (S23).

Being constituted as described hereinabove, this embodiment exhibits the following effect. In this embodiment, the constitution is such that a plurality of disk drives 20 and a plurality of control boards 10 are mounted inside the storage controller 1 so as to be incapable of being replaced by the user. Therefore, the user does not have to perform maintenance work on the storage controller 1, thereby enhancing usability.

Because this embodiment is premised on the fact that the disk drives 20 and control boards 10 cannot be replaced, the constitutions of the disk drives 20 and control boards 10 can be simplified, and the external dimensions can be made smaller than when the premise is that the disk drives and control boards are replaceable. Therefore, according to this embodiment, it is possible to provide a greater number of disk drives 20 inside the same size enclosure. For example, when disk drives and control boards are replaceably installed inside a size 2U enclosure, it is possible to provide a total of 12 disk drives by stacking three rows of four disk drives each one atop the other. By contrast, when disk drives 20 and control boards are irreplaceably installed as in this embodiment, it is possible to provide 14 disk drives 20 inside a size 2U enclosure.

In this embodiment, at least one portion of the respective disk drives 20 mounted beforehand inside the enclosure 2, and preferably a majority or more of the disk drives 20 are affixed inside the enclosure 2 in a state in which the user is not able to replace them. Therefore, it is possible to provide a greater number of disk drives 20 inside the enclosure 2 than with the hot-swapping-enabled mounting systems used in conventional storage controllers.

Because this embodiment comprises a spare disk drive 20 mounted inside the storage controller 1 beforehand, it is possible to carry out data recovery automatically using a spare disk drive 20, thereby enhancing usability and the life of the storage controller 1.

Because this embodiment comprises a repair drive slot 40, even after all the spare disk drives 20 built into the storage controller 1 initially have been used, mounting a new disk drive 20 in the repair drive slot 40 makes it possible to carry out data recovery using this repair disk drive 20. Consequently, usability and the life of the storage controller 1 are further enhanced.

This embodiment is constituted by making the control structure (control boards 10) and power supply structure (power devices 50) of the storage controller 1 redundant. Therefore, even if a failure occurs in any one of the control boards 10 or power devices 50, operation can be continued using the other control board 10 and power device 50, thereby enhancing availability and reliability.

This embodiment is constituted such that the majority of the cooling fans 71, 72, 73 are disposed in the center part of the enclosure 2. Therefore, it is possible to cut down the leakage of noise generated from the cooling fans 71, 72, 73 to the outside of the enclosure 2.

This embodiment is constituted such that a plurality of disk drives 20 are integratively arranged in a matrix in the front side of an enclosure 2. Therefore, it is possible to provide more than two (for example, 8, 12, 16) disk drives 20 inside the enclosure 2.

This embodiment is constituted such that air inlets are disposed between the respective disk drives 20, and the gaps in the direction of the disk drive rows (horizontal direction) are made larger than the gaps in the direction of the tiers (vertical direction) in which the disk drive rows are stacked.

Therefore, it is possible to ensure the inlet area without increasing the thickness dimension of the enclosure 2.

Second Embodiment

A second embodiment will be explained based on FIGS. 9 and 10. The following embodiments, including this embodiment, are equivalent to variations of the first embodiment explained hereinabove. Therefore, the following explanations will focus on those parts that differ from the first embodiment. In this embodiment, copying from a disk drive 20 in which a failure has occurred (also called a failed disk hereinafter) to a spare disk is attempted prior to commencing a correction copy.

Figure 9:
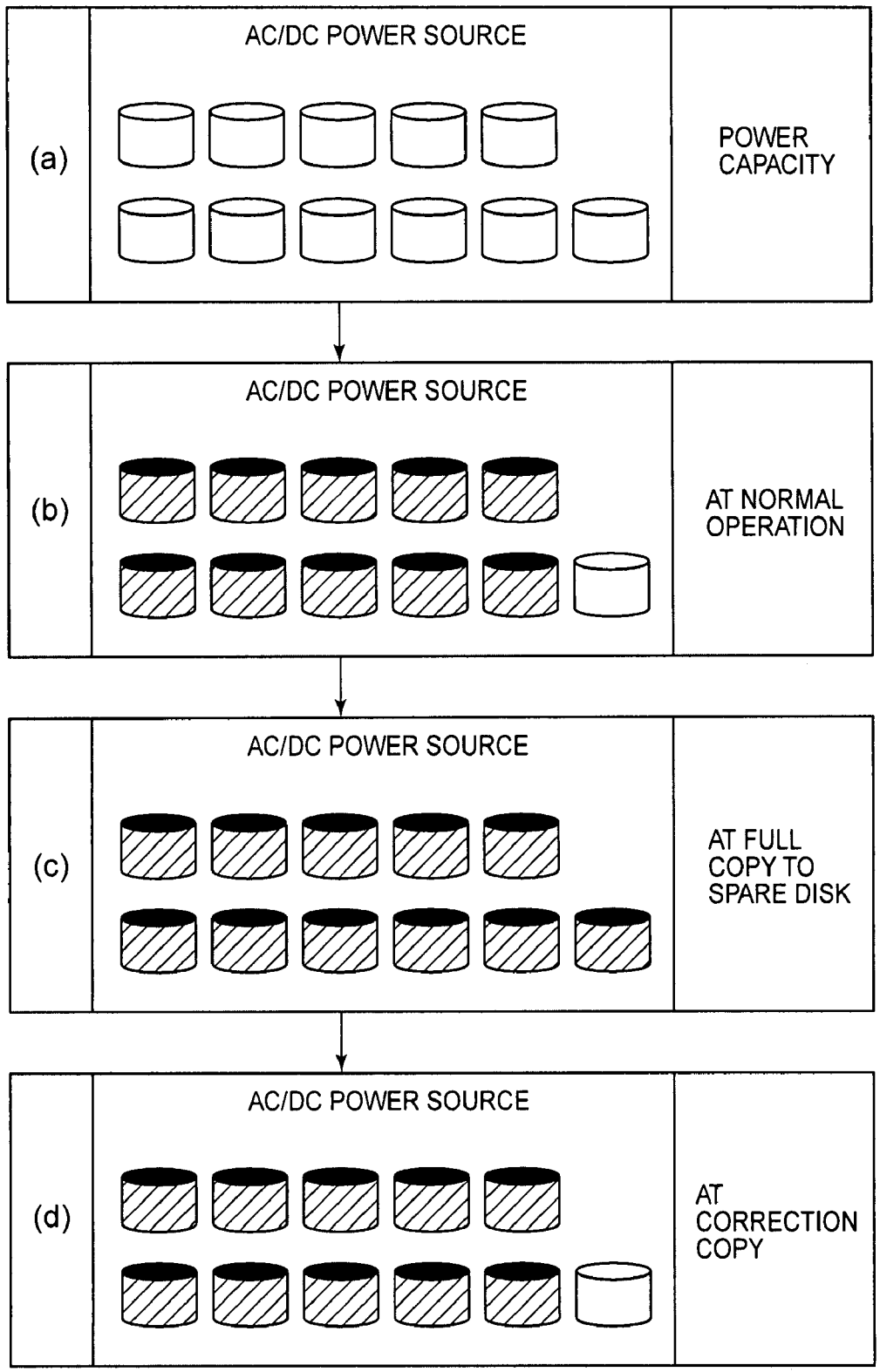
FIG. 9 is a schematic diagram showing changes in power capacity corresponding to the operating mode in a storage controller related to a second embodiment.

FIG. 9 is a schematic diagram respectively showing the power capacity and power supply status of a power device 50 according to this embodiment. In the first embodiment, it was explained that the respective power devices 50 comprise only enough power capacity to be able to simultaneously supply direct current power to 10 disk drives 20. By contrast, the respective power devices 50 of this embodiment each comprise power capacity that enables direct current power to be simultaneously supplied to 11 disk drives 20 as shown in FIG. 9A.

As shown in FIG. 9B, since only eight data disks and two parity disks are used during normal operation, the capacity of the power outputted from the respective power devices 50 is restricted to a value, which enables direct current power to be supplied to 10 disk drives 20.

As shown in FIG. 9C, when a failed disk is detected, copying is carried out from the failed disk to a spare disk. Therefore, the maximum number of disk drives being driven simultaneously inside the storage controller 1 becomes 11 (=10+1). Accordingly, the capacity of the power outputted from the respective power devices 50 is increased to 11 units' worth of disk drives.

As shown in FIG. 9D, when the data stored in a failed disk can not be restored by a copy process from the failed disk to a spare disk, a correction copy is commenced. In a correction copy, as explained hereinabove, data and parity stored in the other disk drives 20 belonging to the same parity group as the failed disk drive 20 are read out, a logical operation is performed, and the data restored by this logical operation is stored in a spare disk. In a correction copy, the maximum number of disk drives being driven simultaneously inside the storage controller 1 is 10 the same as during normal operation. This is because the power supply to the failed disk is stopped, and power is supplied to the spare disk instead. Accordingly, the capacity of the power outputted from the respective power devices 50 is set at 10 units' worth of disk drives. Thus, in this embodiment, the power capacity of the respective power devices 50 is restricted in accordance with the operating mode of the storage controller 1 (normal operating mode, spare disk copy mode, correction copy mode).

Figure 10:
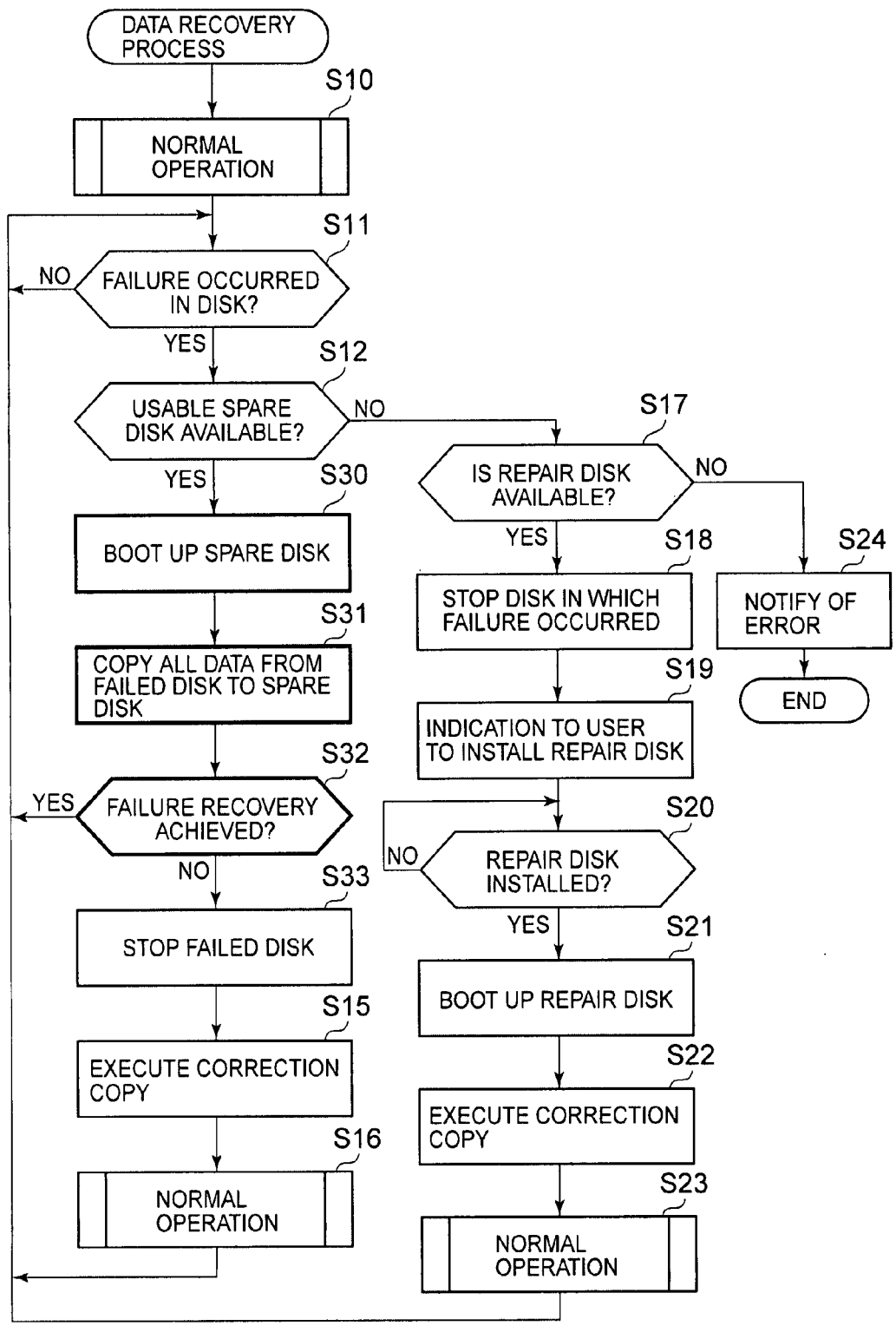
FIG. 10 is a flowchart showing a data recovery process.

FIG. 10 is a flowchart showing a data recovery process in accordance with this embodiment. This flowchart comprises the steps S10 through S12 and S15 through S24 of the flowchart shown in FIG. 8, S30 through S33 are employed as new steps in place of S13 and S14. Accordingly, the explanation will focus on the new steps of S30 through S33.

When a failure is detected in any of the disk drives 20 (S11: YES), the storage controller 1 determines whether or not a spare disk can be used (S12). If a usable spare disk exists (S12: YES), the storage controller 1 supplies power to and boots up this spare disk (S30). Unlike in FIG. 8, power is also being supplied to the failed disk at this time. Then, the storage controller 1 copies data from the failed disk to the spare disk (S31).

The storage controller 1 determines whether or not failure recovery was achieved (S32). That is, the storage controller 1 makes a determination as to whether or not the data copy from the failed disk to the spare disk ended normally, and all the data stored in the failed disk can be used by the spare disk.

When failure recovery was achieved by the data copy from the failed disk to the spare disk (S32: YES), the storage controller 1 returns to S11 and continues monitoring. By contrast, when failure recovery was not achieved by the data copy from the failed disk to the spare disk (S32: NO), the storage controller 1 stops the power supply to the failed disk (S33), and executes a correction copy (S34). For example, when even a part of the data could not be read from the failed disk, the determination is that data recovery by the copy to the spare disk failed. In this case, as described in the first embodiment, all of the data stored in the failed disk is restored by a correction copy.

Being constituted like this, this embodiment also exhibits the same effect as the above-mentioned first embodiment. In addition to this, in this embodiment, when a failure is detected in a disk drive 20, instead of starting a correction copy right away, a data copy is attempted from the disk drive 20 in which the failure occurred to a spare disk drive 20. Therefore, data can be recovered more efficiently, thereby enhancing usability. According to the type of failure, an error can be temporary, and the failed disk can be accessed. Executing a correction copy in the case of a relatively minor failure like this means that data recovery will take a long time, increasing the load on the control board 10. By contrast, in this embodiment, first an attempt is made to read out all the data from the failed disk, and only when this attempt fails is a correction copy executed. Therefore, it is possible to shorten data recovery time in the case of a minor failure, thereby enhancing usability.

Further, in this embodiment, the power capacity of the respective power devices 50 is restricted in accordance with the operating mode of the storage controller 1, and power is supplied at a capacity deemed necessary for each operating mode. Consequently, it is possible to reduce the power consumption of the storage controller 1.

Third Embodiment

Figure 11:
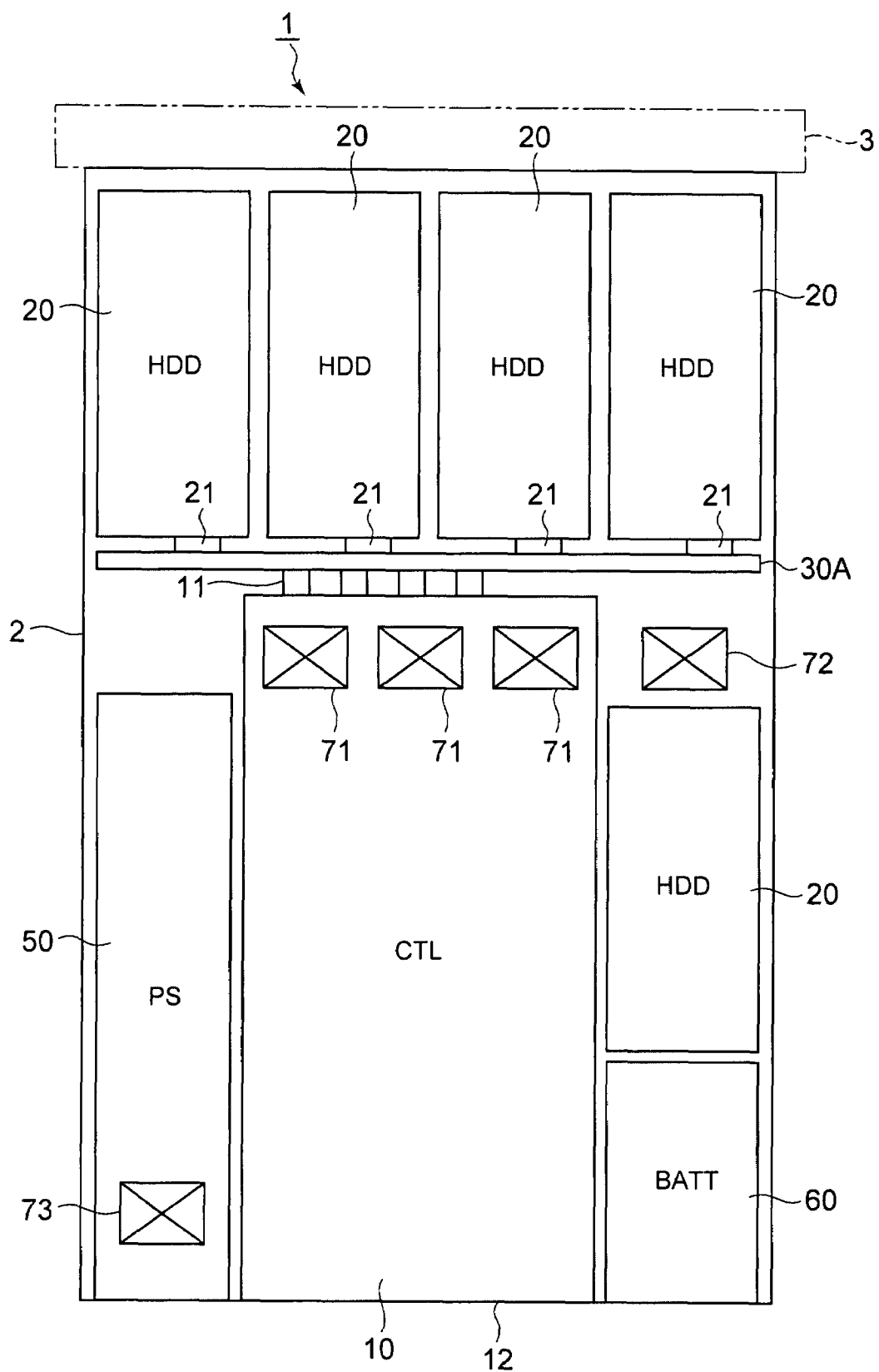
FIG. 11 is a plan view of a storage controller related to a third embodiment.

FIG. 11 is a plan view showing a storage controller 1 related to a third embodiment with the enclosure 2 and front bezel 3 removed. In this embodiment, a backboard 30A is used instead of the backboard 30 of the first embodiment.

This backboard 30A is constituted from a single board, and the respective disk drives 20 are connected to the front side thereof. The respective control boards 10 are connected to the rear side of the backboard 30A.

Being constituted like this, this embodiment also exhibits the same effect as the above-mentioned first embodiment. In addition to this, in this embodiment, since the backboard 30A is made of a single board, it is possible to reduce the number of component parts and the number of assembly processes compared to the first embodiment.

Fourth Embodiment

Figure 12:
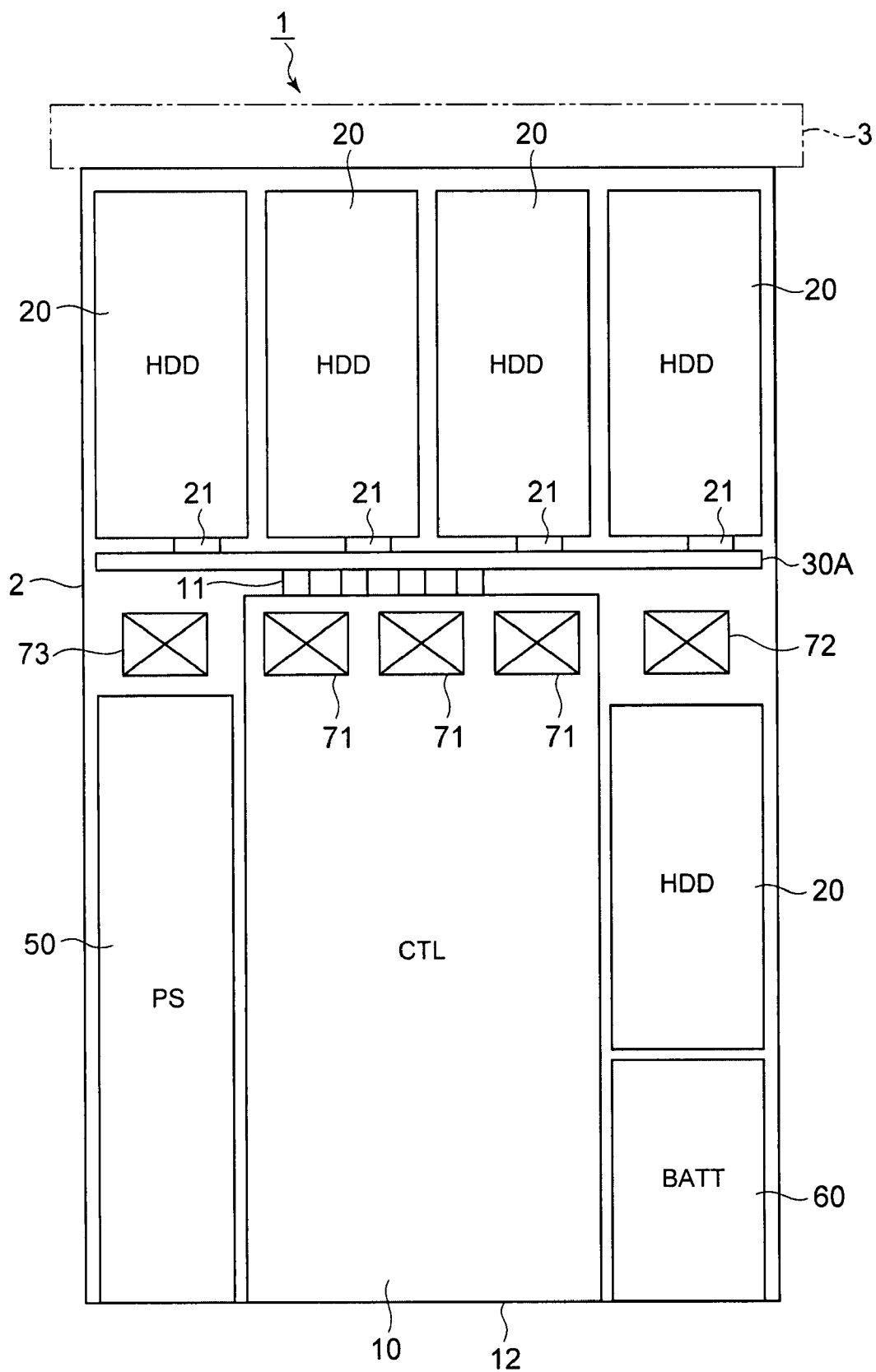
FIG. 12 is a plan view of a storage controller related to a fourth embodiment.

FIG. 12 is a plan view showing a storage controller 1 related to a fourth embodiment with the enclosure 2 and front bezel 3 removed. In this embodiment, all of the cooling fans 71, 72, 73 are arranged approximately in the center part of the enclosure 2.

In the above-mentioned first embodiment, the cooling fan 73 for cooling the respective power devices 50 is arranged toward the rear of the enclosure 2. By contrast, in this embodiment, cooling fan 73 is also arranged approximately in the center part of the enclosure 2. More accurately, all of the cooling fans 71, 72, 73 are arranged at the rear side of the backboard 30A, which is disposed rearward of the respective disk drives 20.

Being constituted like this, this embodiment also exhibits the same effect as the above-mentioned first embodiment. In addition to this, in this embodiment, since all of the cooling fans 71, 72, 73 are arranged approximately in the center part of the enclosure 2, it is possible to further suppress the leakage of fan noise to the outside of the enclosure 2.

Fifth Embodiment

A fifth embodiment will be explained based on FIGS. 13 and 14. In this embodiment, the arrangements of the disk drives 20, power devices 50 and batteries 60 are altered from the arrangement described in the first embodiment.

Figure 13:
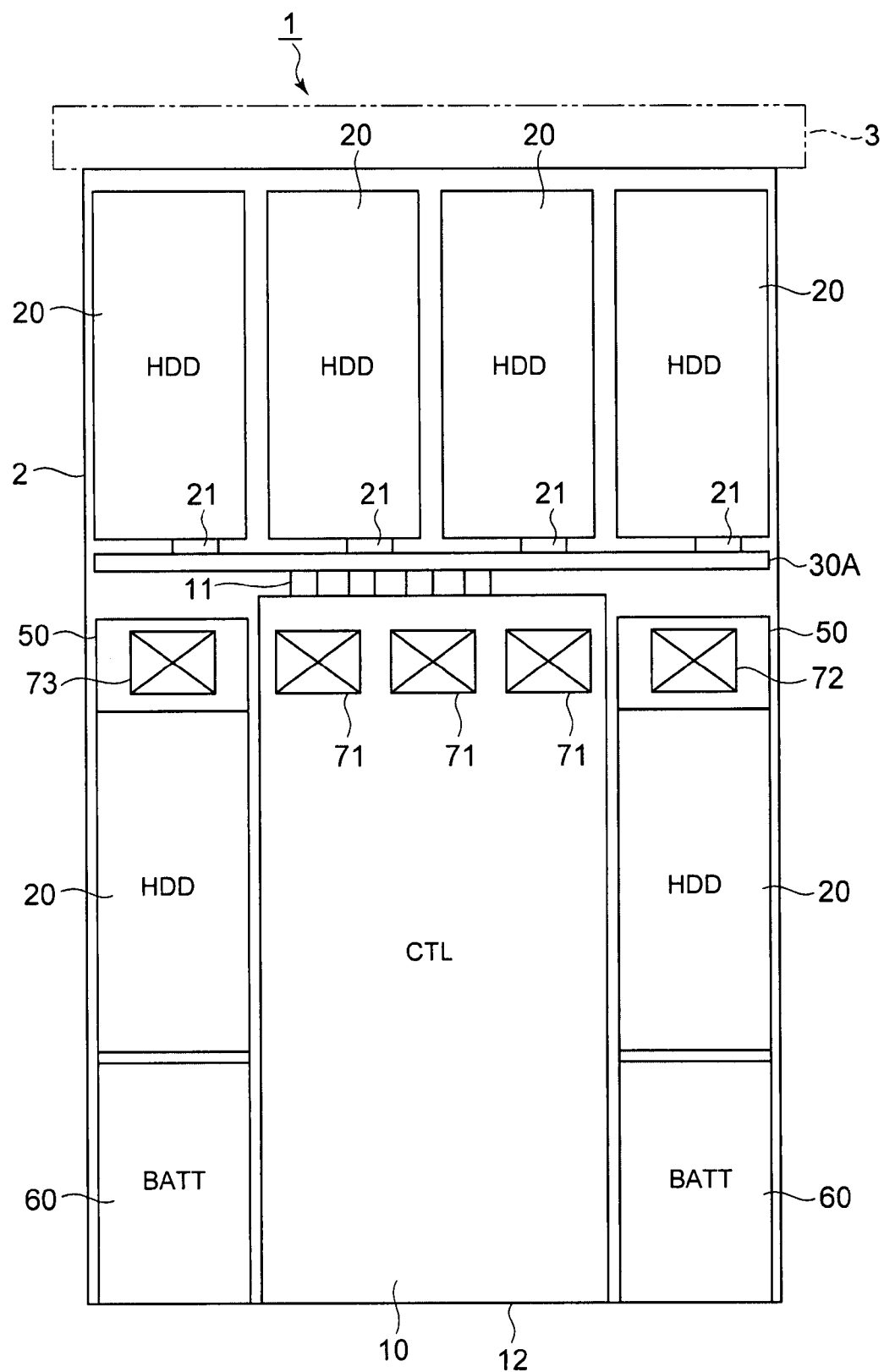
FIG. 13 is a plan view of a storage controller related to a fifth embodiment.
Figure 14:
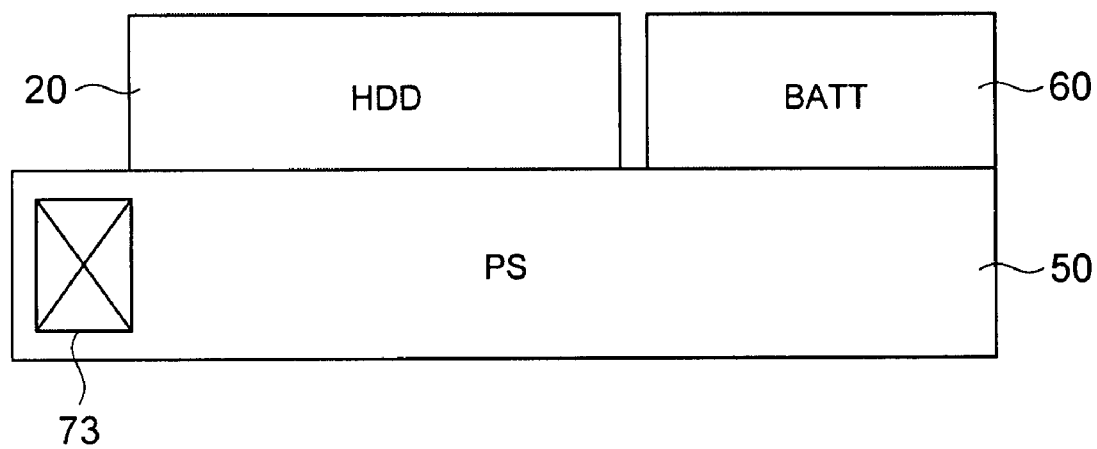
FIG. 14 is a side view of a storage controller focusing on the power device.

FIG. 13 is a plan view showing a storage controller 1 related to the fifth embodiment with the enclosure 2 and front bezel 3 removed. The respective power devices 50 are disposed one each on both sides of the respective control boards (on the right side and left side in FIG. 13). The disk drives 20 are disposed on the front side (the backboard 30A side) and the batteries 60 are disposed rearward on the power devices 50:

FIG. 14 is a side view focusing on a power device 50 with the enclosure 2 removed. As described above, a disk drive 20 and battery 60 are located on top of the power device 50.

Being constituted like this, this embodiment also exhibits the same effect as the above-mentioned first embodiment. In addition to this, in this embodiment, the control boards 10 are arranged in the center, and the power devices 50, disk drives 20 and batteries 60 are arranged in bilateral symmetry on the right and left sides thereof. Therefore, the flow of cooling air inside the enclosure 2 can be made relatively uniform, and cooling can be carried out more efficiently.

Sixth Embodiment

A sixth embodiment will be explained based on FIGS. 15, 16 and 17. In this embodiment, a single control board is constituted from two circuit boards 10A, 10B having sizes that are different in area, and a plurality of control structures are redundantly disposed on this single control board.

Figure 15:
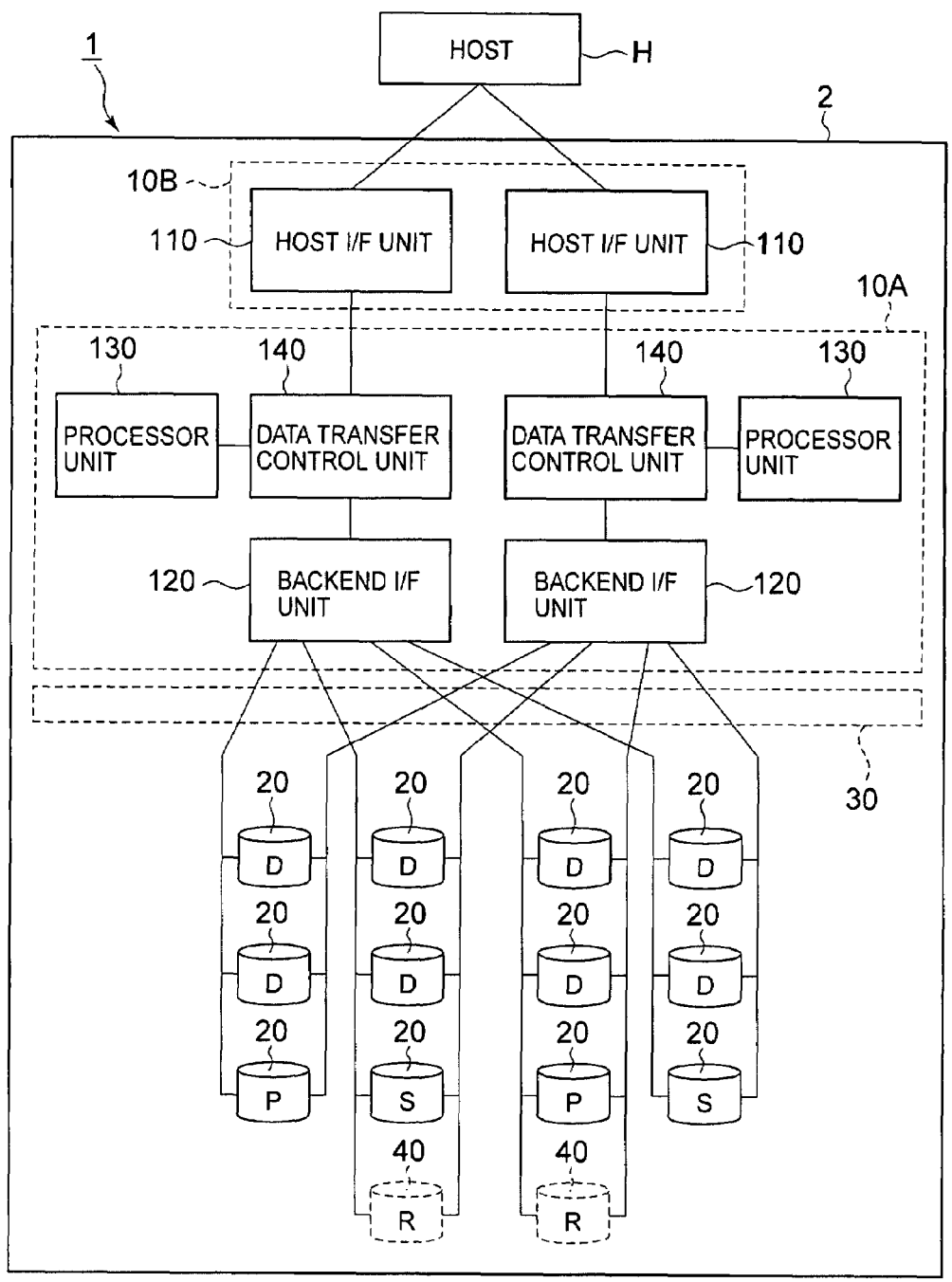
FIG. 15 is a block diagram of a storage controller related to a sixth embodiment.

FIG. 15 is a block diagram of a storage controller 1 according to this embodiment. This storage controller 1 comprises two control structures the same as the above-mentioned first embodiment. The respective control structures are constituted from a host interface unit 110, backend interface unit 120, processor unit 130, and data transfer control unit 140.

The control board is constituted from a main board 10A, which is located on the bottom side of the enclosure 2, and a sub-board 10B, which is mounted on top of the main board 10A. Two backend interface units 120, two processor units 130, and two data transfer control units 140 are disposed on the main board 10A. Two host interface units 110 are disposed on the sub-board 10B. The main board 10A and the sub-board 10B are electrically connected via a connector.

Figure 16:
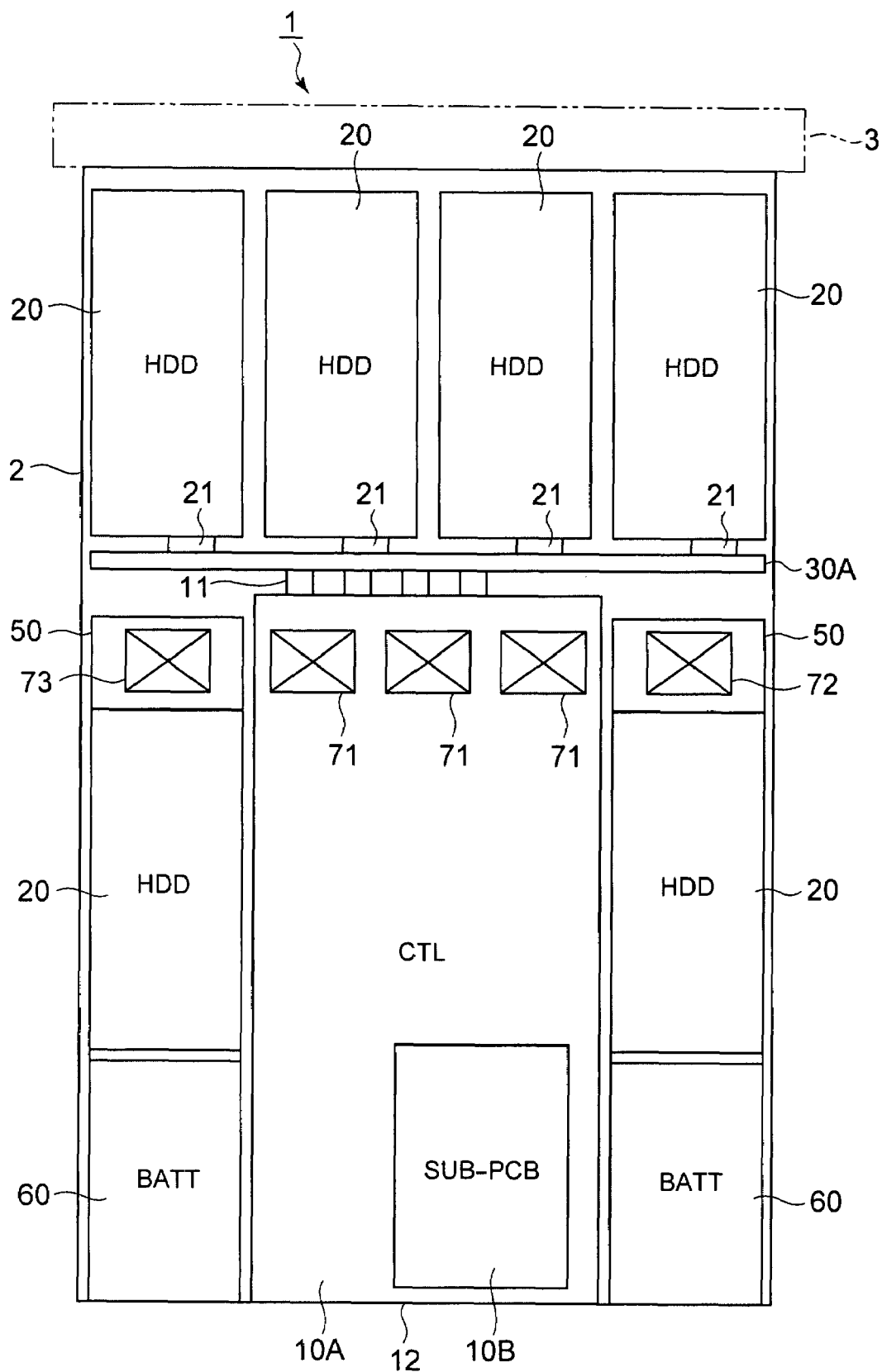
FIG. 16 is a plan view of the storage controller.
Figure 17:
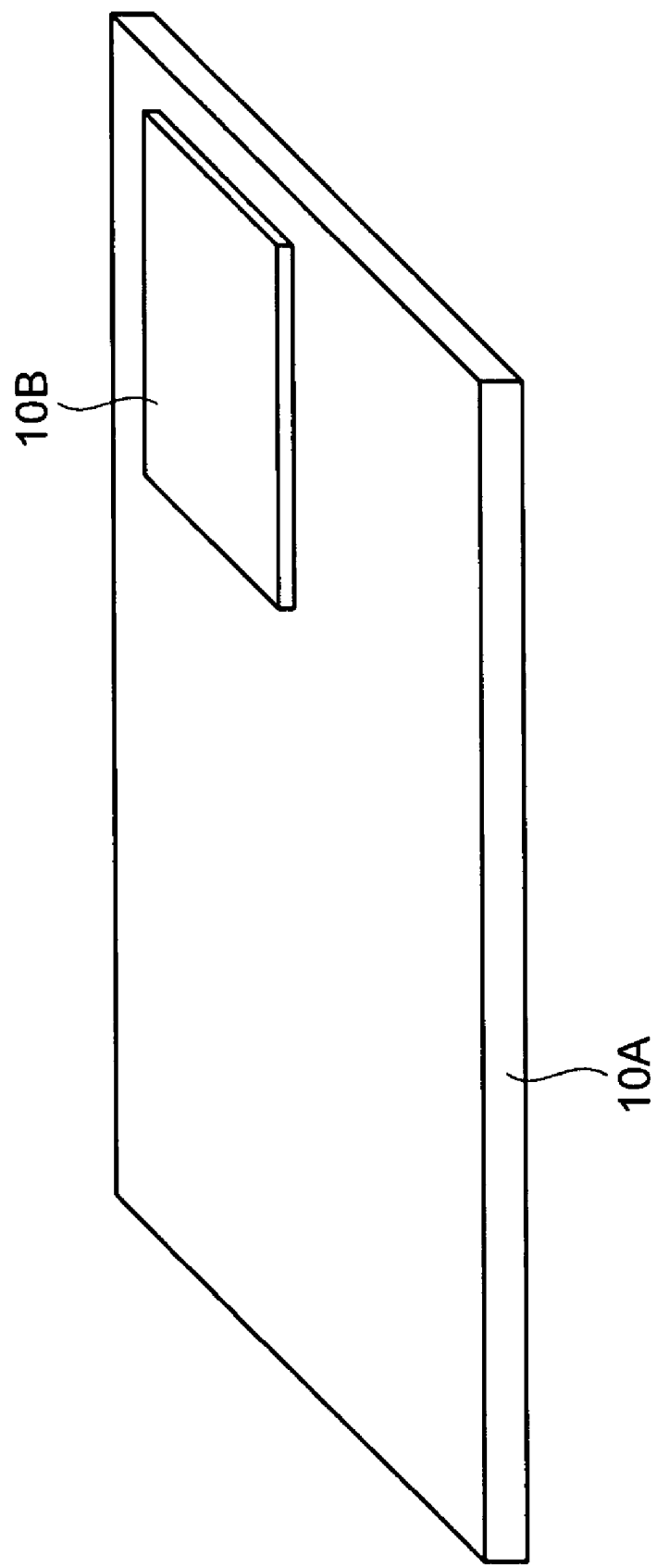
FIG. 17 is an oblique view focusing on the relationship between a main board and a sub-board.

FIG. 16 is a plan view showing the storage controller 1 with the enclosure 2 and front bezel 3 removed. FIG. 17 is an oblique view schematically showing the physical relationship of the main board 10A and the sub-board 10B. As shown in FIGS. 16 and 17, the sub-board 10B, for example, can be located toward the posterior of the enclosure 2, and can be disposed on top of the main board 10A.

The location of the sub-board 10B is not limited to the example shown in the figures. If a large amount of heat is generated by the electronic circuitry (here, the respective host interfaces 110) mounted on the sub-board 10B, the sub-board 10B can be positioned closer to the cooling fan 71 side. If a small amount of heat is generated by the electronic circuitry mounted on the sub-board 10B, the sub-board 10B can be positioned in a location away from the cooling fan 71 as shown in FIG. 13. Further, when an electronic circuit, like the host interface unit 110, which is connected by cable to a device (here, a host H) outside of the enclosure 2 is mounted to the sub-board 10B, as shown in FIG. 13, connection to the external device becomes easier if the sub-board 10B is positioned close to the outside of the enclosure 2.

Of the plurality of types of circuits (110, 120, 130, 140) respectively comprising the plurality of redundant control structures, a prescribed circuit (110) is disposed on the sub-board 10B, and the other circuits (120, 130, 140) are disposed on the main board 10A.

Other circuitry can also be mounted on the sub-board 10B. For example, the constitution can also be such that two backend interface units 120, or two processor units 130 are mounted on the sub-board 10B instead of two host interface units 110. Or, the constitution can also be such that a plurality of types of circuitry are mounted on the sub-board 10B.

Being constituted like this, this embodiment also exhibits the same effect as the above-mentioned first embodiment. In addition to this, in this embodiment, a single control board is constituted from two circuit boards 10A, 10B having different areas, and two logically duplexed control structures are formed by electronic circuits mounted on the respective circuit boards 10A, 10B. In other words, this embodiment uses circuit boards, which have asymmetrical physical constitutions, and makes the logical constitution redundant. Consequently, in this embodiment, the area and volume of the control board can be reduced compared to the above-mentioned first embodiment. Therefore, relatively wide cooling air passages can be formed inside the enclosure 2, thereby enabling heightened cooling efficiency.

When a storage controller 1 is premised on the respective elements (disk drives, control boards, and so forth) being replaced by the user, it is advantageous to make the control structure redundant by using a plurality of circuit boards that are the same physically. This is because using two control boards having the same physical structure simplifies maintenance work, and lowers the manufacturing costs of the control board. By contrast, the storage controller 1 of the present invention makes it impossible for the respective elements to be replaced by the user. Therefore, as described hereinabove, it is possible to provide a plurality of redundant control structures by using a plurality of types of circuit boards that differ physically.

Seventh Embodiment

A seventh embodiment will be explained based on FIGS. 18 and 19. In this embodiment, a single control board is made from a plurality of circuit boards having different physical constitutions, and the control structure is made redundant by providing a plurality of these control boards.

Figure 18:
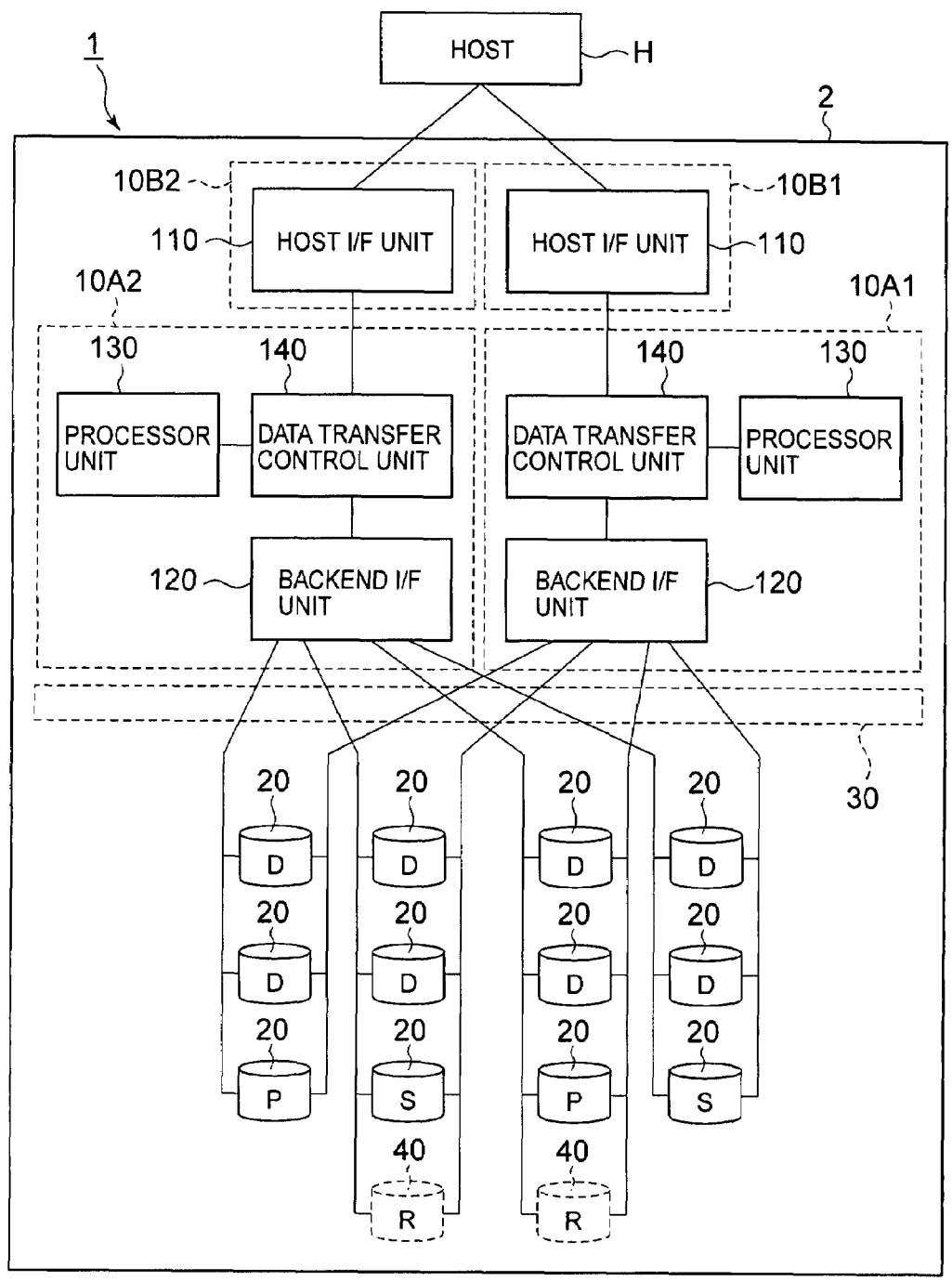
FIG. 18 is a block diagram of a storage controller related to a seventh embodiment.

FIG. 18 is a block diagram of a storage controller 1 according to this embodiment. The one control board, which is shown on the right side of the figure, is constituted from a main board 10A1 and a sub-board 10B1. One backend interface unit 120, one processor unit 130, and one data transfer control unit 140 are disposed on the main board 10A1. One host interface unit 110 is disposed on the sub-board 10B1.

Similarly, the other control board, which is shown on the left side of the figure, is constituted from a main board 10A2, on which are disposed one backend interface unit 120, one processor unit 130, and one data transfer control unit 140, and a sub-board 10B2, on which is disposed one host interface unit 110.

Figure 19:
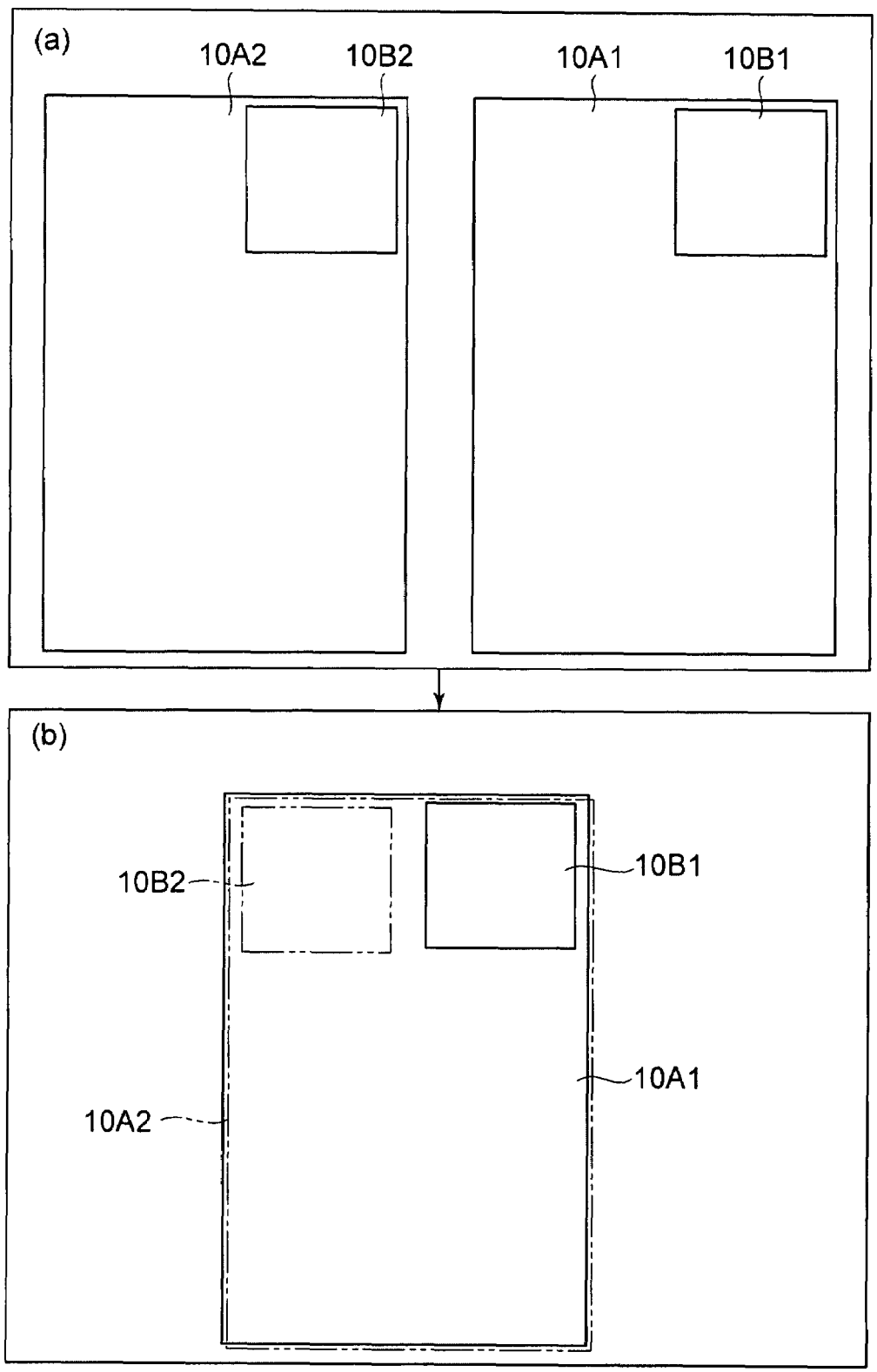
FIG. 19 is a schematic diagram showing opposably arranged control boards.

FIG. 19 is a diagram schematically showing control boards in the mounted state. As shown in FIG. 19A, the one control board is constituted from a main board 10A1, and a sub-board 10B1, which is located on the side at one end of the main board 10A1, and is electrically connected to and disposed on top of the main board 10A1. Similarly, the other control board is constituted from a main board 10A2, and a sub-board 10B2, which is located on the side at one end of the main board 10A2, and is electrically connected to and disposed on top of the main board 10A2.

As shown in FIG. 19B, the respective control boards are opposably mounted inside the enclosure 2 such that the one control board is located on the bottom and the other control board is located on the top. The other main board 10A2 and the other sub-board 10B2, which are located on top, are shown by virtual lines.

This embodiment also exhibits the same effect as the above-mentioned first embodiment. In addition to this, in this embodiment, the constitution is such that the respective control boards are made from a plurality of circuit boards (a main board and a sub-board), which differ in size physically, and the respective control boards are opposably mounted inside the enclosure 2. Therefore, it is possible to reduce the projected area to the horizontal plane of the respective control boards, and to make the control boards smaller. Further, because the respective control boards are opposably arranged so that the sub-boards 10B1, 10B2 do not interfere with one another, the height dimension of the control boards can be made relatively small even when the two control boards are stacked one atop the other. Therefore, it is possible to make the size of the enclosure 2 smaller, thereby enhancing usability.

Eighth Embodiment

Figure 20:
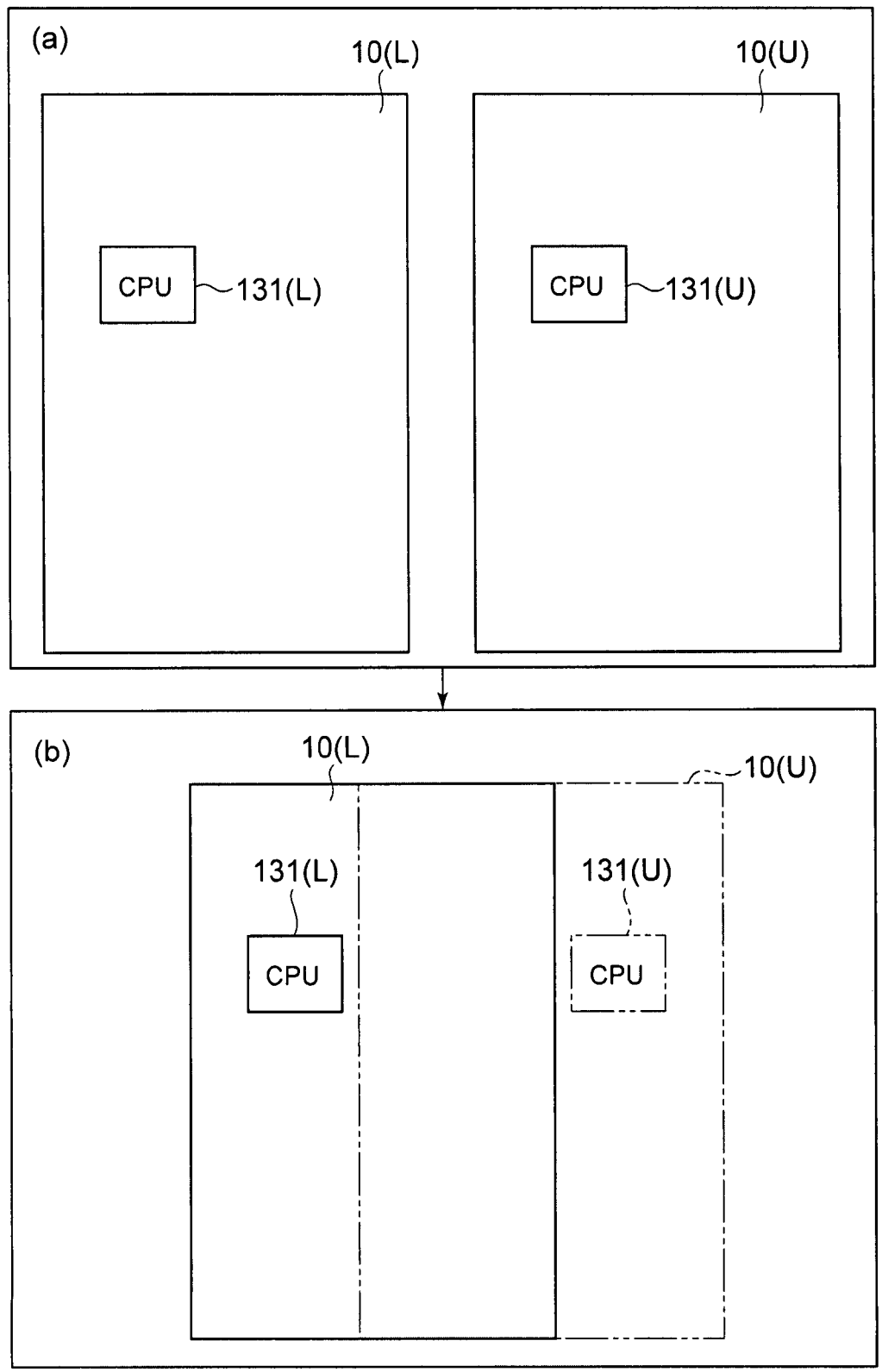
FIG. 20 is a schematic diagram showing an overview of the constitution of a control board of a storage controller related to an eighth embodiment.

An eighth embodiment will be explained based on FIG. 20. This embodiment gives examples of the arrangement of a microprocessor 131 and the arrangement of a control board 10.

FIG. 20A is a schematic plan view of control boards 10 focusing on the location of the microprocessors 131.

As shown in FIG. 20B, this embodiment is constituted such that the one control board 10 (L) is located on the bottom, and the other control board 10 (U) is located on the top, and these control boards 10 (L), 10 (U) are mounted inside the enclosure 2 in an opposable state so that the microprocessors 131 (L), 131 (U) do not interfere with one another. Control board 10 (L) and control board 10 (U) are arranged face-to-face in a horizontally shifted state in the figure so that the microprocessors 131 (L), 131 (U) do not come in contact with one another's boards. Being constituted like this, this embodiment also exhibits the same effect as the above-mentioned first embodiment.

Ninth Embodiment

A ninth embodiment will be explained based on FIGS. 21 through 23. In this embodiment, the constitution is such that a backboard 30B is arranged horizontally, and a plurality of disk drives 20 are respectively mounted on the top and bottom of the backboard 30B.

Figure 21:
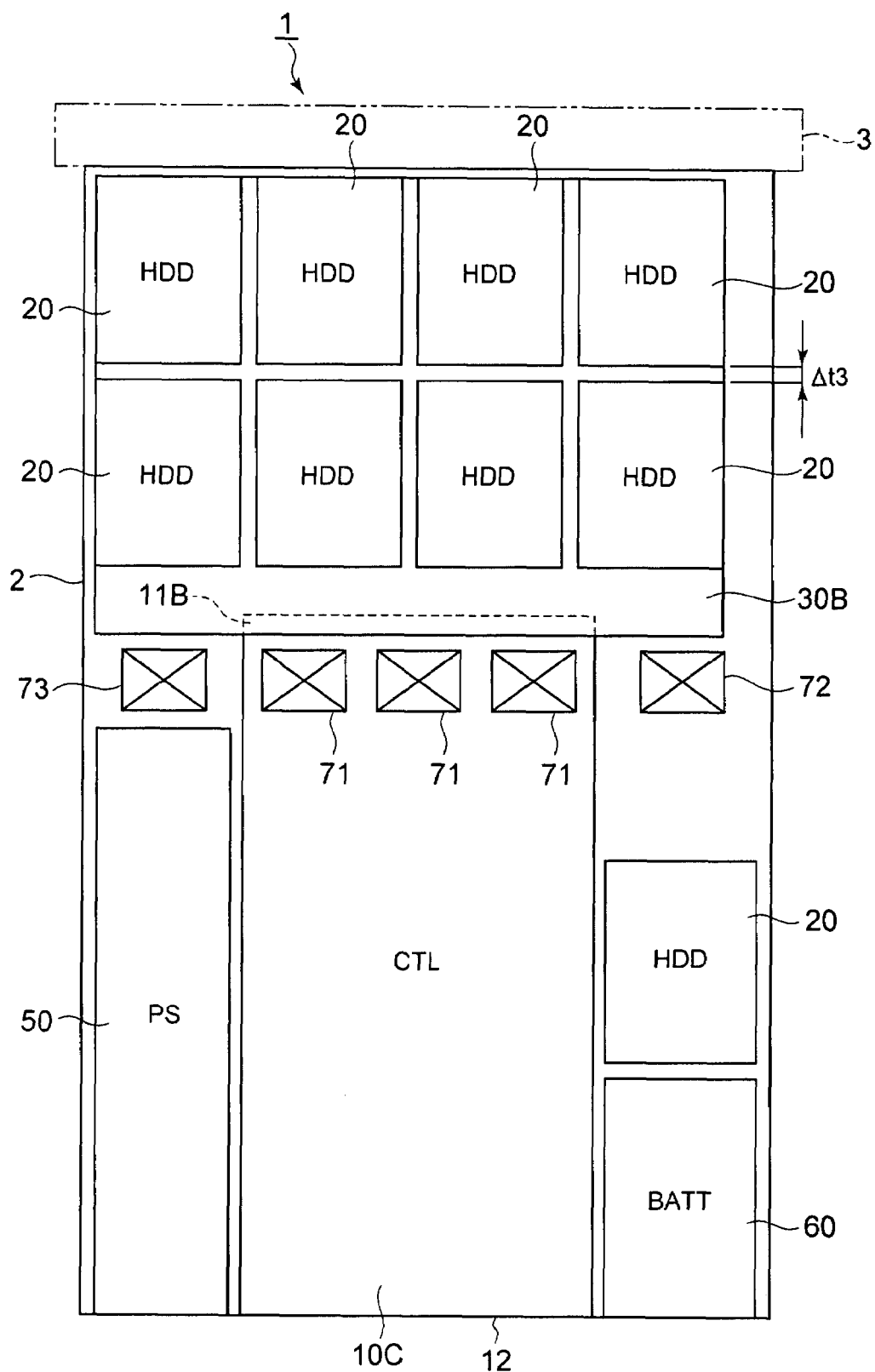
FIG. 21 is a plan view of a storage controller related to a ninth embodiment.

FIG. 21 is a plan view showing a storage controller 1 related to the ninth embodiment with the enclosure 2 and front bezel 3 removed. A backboard 30B is mounted horizontally on the front side of the enclosure 2. A control board 10C is disposed rearward of the backboard 30B so as to partially overlap with the posterior of the backboard 30B. Two each host interface units 110, backend interface units 120, processor units 130, and data transfer control units 140 are disposed on the single circuit board of this control board 10C. Furthermore, as described in another embodiment mentioned hereinabove, a single control board can also be constituted from a main board and a sub-board, which differ in size.

Figure 22:
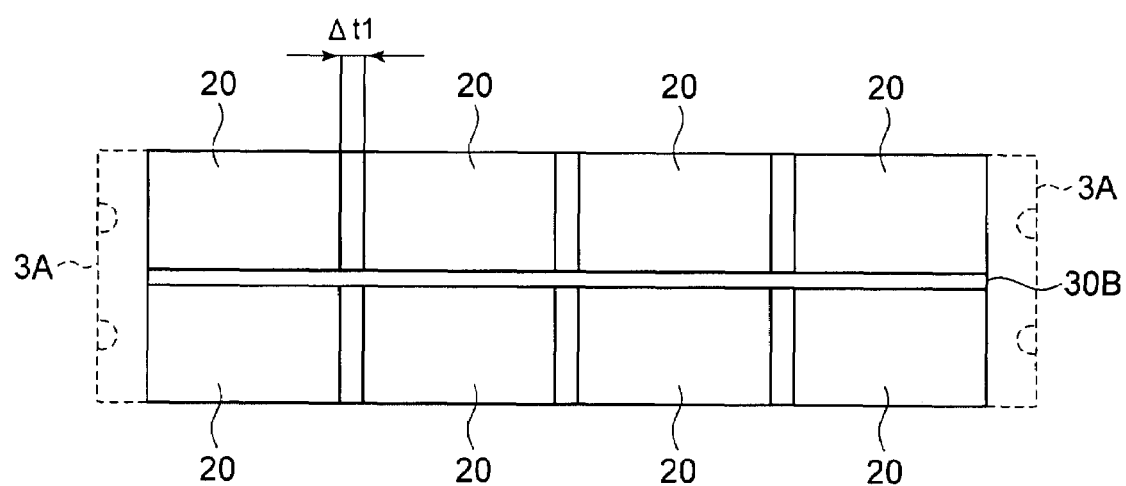
FIG. 22 is a front view of the storage controller.

FIG. 22 is a front view showing the storage controller 1 with the front bezel 3 removed. A plurality (here, 8) of disk drives 20 are respectively mounted on the top surface and bottom surface of the backboard 30B. As shown in FIG. 21, four disk drives 20 are arranged in a row on the front side of the backboard 30B, and four disk drives 20 are also arranged in a row rearward of the backboard 30B. Similarly, a total of two rows of four disk drives 20 each are arranged on the bottom side of the backboard 30B as well.

As shown in FIG. 22, gaps Δt1 are disposed in the row direction of the respective disk drives 20, and these gaps Δt1 constitute air inlets. Further, as shown in FIG. 21, another gap Δt3 is disposed between the row of disk drives located on the front side of the backboard 30B and the row of disk drives located rearward of the backboard 30B. This gap Δt3 forms either an air inlet or an airflow passage. The gap Δt3 can be made to function as an air inlet by disposing punched holes or other such openings in both sides on the front side of the enclosure 2.

Figure 23:
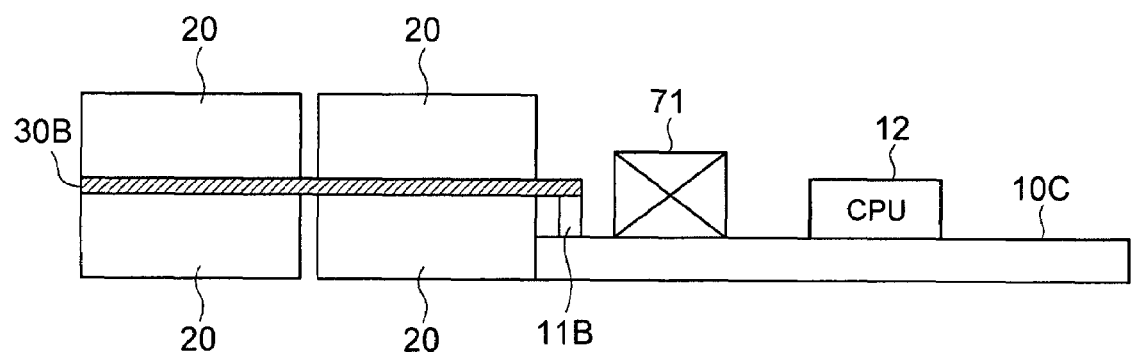
FIG. 23 is a side view of a storage controller focusing on the control board and a backboard.

FIG. 23 is a schematic side view focusing on the relationship of the backboard 30B and the control board 10C. The backboard 30B and the control board 10C are slightly separated in the vertical direction, and are disposed horizontally. A connector 11B is perpendicularly disposed at the front end of the control board 10C, and the backboard 30B and the control board 10C are electrically connected via the connector 11B.

Being constituted like this, this embodiment also exhibits the same effect as the above-mentioned first embodiment. In addition to this, in this embodiment, a respective plurality of disk drives 20 are arranged on both the top and bottom surfaces of the backboard 30B, and a control board 10C is arranged at the rear end side of the backboard 30B. Therefore, it is possible to further reduce the thickness dimension of the enclosure 2 compared to that of the first embodiment.

Tenth Embodiment

Figure 24:
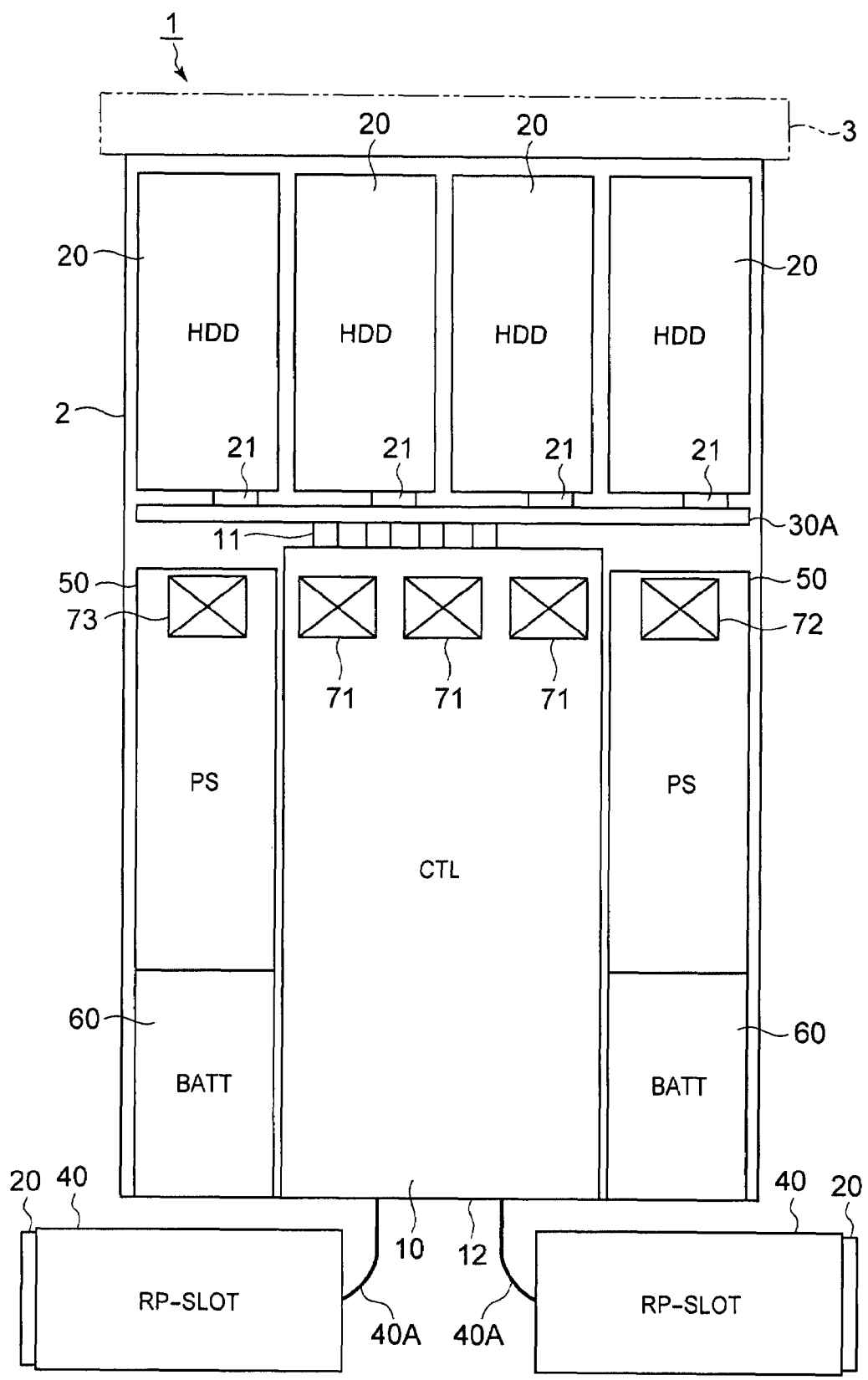
FIG. 24 is a plan view of a storage controller related to a tenth embodiment.

FIG. 24 shows a plan view of a storage controller 1 related to a tenth embodiment. In this embodiment, a plurality of repair drive slots 40 are disposed outside the enclosure 2, and the respective repair drive slots 40 are connected to the control board 10 inside the enclosure 2 by a communications cable 40A.

Setting the communication cable 40A to a certain length enables the user to insert/remove a repair disk drive 20 into/from a repair drive slot 40 without removing the enclosure 2 from the rack. Furthermore, connecting a repair drive slot 40 and a control board 10 via a cable is also advantageous from the standpoints of security and equipment management. However, when it is possible to use encrypted wireless communications, the constitution can also be such that a repair drive slot 40 and control board 10 are connected wirelessly.

Being constituted like this, this embodiment also exhibits the same effect as the above-mentioned first embodiment. In addition to this, in this embodiment, because the repair drive slots 40 are disposed outside of the enclosure 2, repair disk drives 20 can be inserted and removed easily, thereby enhancing usability.

Furthermore, the present invention is not limited to the embodiments described hereinabove. A person with an ordinary skill in the art can make various additions and changes without departing from the scope of the invention.

The present invention, for example, can be understood from the following aspects. A first aspect is a storage controller capable of providing beforehand a majority or more, preferably 80% or more, of the total number of storage devices disposed in an enclosure as fixed-type storage devices, which cannot be replaced in the enclosure, and replaceably providing in the enclosure other storage devices besides the fixed-type storage devices, as replaceable-type storage devices.

A second aspect is a storage controller, which comprises a plurality of fixed-type storage devices provided beforehand in the enclosure so as to be irreplaceable, and at least one replaceable-type storage device provided in the enclosure so as to be replaceable, and the number of replaceable-type storage devices is set at the same number as the number of reserved storage devices capable of being arbitrarily selected from among the fixed-type storage devices.

The above first and second aspects are examples, and cannot be used to interpret the present invention's scope of rights more narrowly than the scope disclosed in the claims. Further, the present invention can also be understood from other aspects besides the above-mentioned first and second aspects, based on the matters disclosed in this specification and the matters disclosed in the figures.

What is claimed is:

1. A storage controller, comprising:
an enclosure;
a plurality of storage devices, which are disposed inside said enclosure, and which are for storing data;
at least one control board, which is disposed inside said enclosure, and which is for controlling the operation of said respective storage devices;
at least one power device, which is disposed inside said enclosure, and which is for supplying power to said respective storage devices and said control board;
at least one cooling fan, which is disposed inside said enclosure, and which takes in air from outside said enclosure and generates cooling air inside said enclosure; and
at least one device connector for connecting a new storage device, which is different from said respective storage devices inside said enclosure, to said control board,
wherein at least said respective storage devices, said control board, said power device, and said cooling fan are disposed inside said enclosure so as to be irreplaceable under normal circumstances, and
said new storage device can be replaceably attached to said device connector to enable the storage of data even when said respective storage devices, which have been irreplaceably mounted in said enclosure beforehand, become incapable of being used, wherein
said plurality of storage devices are arranged in a matrix in one side of said enclosure by placing said respective storage devices in close proximity to form a row, and stacking a plurality of rows in close proximity one atop the other, said control board is located at the other side of said enclosure, and is disposed inside said enclosure so as to be irreplaceable under normal circumstances, said respective storage devices and said control board are connected via a connection board, said connection board being located in the one side of said enclosure, and is disposed horizontally inside said enclosure, inlets for taking air inside said enclosure are formed between said respective storage devices, an outlet for discharging cooling air generated by said cooling fan to the outside of said enclosure is formed at the other side of said enclosure, said respective storage devices are arranged in the same numbers on the top surface and bottom surface of said connection board, and are respectively connected to said connection board, and said control board is horizontally disposed inside said enclosure so as to be connected to one end of said connection board.

2. The storage controller according to claim 1, wherein at least one storage device of said respective storage devices disposed beforehand inside said enclosure is preconfigured as a reserved storage device.

3. The storage controller according to claim 1, wherein said control board is made from a set of two circuit boards having the same configuration, and control structures for controlling the operations of said respective storage devices are disposed on said respective circuit boards.

4. The storage controller according to claim 1, wherein said control board is made from a plurality of circuit boards having a different shape, and a control structure for controlling the operations of said respective storage devices is duplexed by electronic circuitry formed on said respective circuit boards.

5. The storage controller according to claim 1, wherein said cooling fan is located substantially in the center between an inlet disposed in one face of said enclosure, and an outlet disposed in the other face of said enclosure, and is arranged on the inside of said enclosure so as to be irreplaceable under normal circumstances.

6. The storage controller according to claim 1, wherein said connection board is perpendicularly disposed inside said enclosure, and said respective storage devices are connected to one side of said connection board, and said control board is connected to the other side of said connection board.

7. The storage controller according to claim 1, wherein said power device comprises power capacity corresponding to the number of storage devices, which have a possibility of being used simultaneously, of said respective storage devices.

* * * * *